US012568420B1

(12) United States Patent
VonEhr

(10) Patent No.: US 12,568,420 B1
(45) Date of Patent: Mar. 3, 2026

(54) TOGGLING NETWORK OPERATOR CONNECTIVITY FOR AUTONOMOUS VEHICLES

(71) Applicant: GM Cruise Holdings LLC, San Francisco, CA (US)

(72) Inventor: Kurt VonEhr, Oakland, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 349 days.

(21) Appl. No.: 18/350,667

(22) Filed: Jul. 11, 2023

(51) Int. Cl.
| | |
|---|---|
| *H04W 24/02* | (2009.01) |
| *H04B 17/318* | (2015.01) |
| *H04W 36/30* | (2009.01) |
| *H04W 36/32* | (2009.01) |
| *H04W 88/06* | (2009.01) |

(52) U.S. Cl.
CPC ........ *H04W 36/324* (2023.05); *H04B 17/318* (2015.01); *H04W 24/02* (2013.01); *H04W 36/30* (2013.01); *H04W 88/06* (2013.01)

(58) Field of Classification Search
None
See application file for complete search history.

(56) References Cited

U.S. PATENT DOCUMENTS

| | | | | |
|---|---|---|---|---|
| 2017/0208540 | A1* | 7/2017 | Egner | H04W 64/003 |
| 2021/0112423 | A1* | 4/2021 | Maheshwari | H04W 36/322 |
| 2023/0224794 | A1* | 7/2023 | Elhadeedy | H04W 40/30 |
| | | | | 455/452.1 |

\* cited by examiner

*Primary Examiner* — Idowu O Osifade
(74) *Attorney, Agent, or Firm* — CANTOR COLBURN LLP

(57) ABSTRACT

Loss of connectivity between an AV with the back-office system may cause the vehicle to enter a degraded state, which may result in manual retrieval of the vehicle. The AV can maintain two redundant network data connections with two network operators using two dual-SIM, dual-standby network access devices. An algorithm can be implemented to select which two network operators to connect with using four different eSIMs. The algorithm can utilize locally measured network operator quality measurement data to make swapping decisions. The algorithm can utilize network operator connectivity quality information aggregated from network operator quality measurement data collected by many AVs.

20 Claims, 14 Drawing Sheets

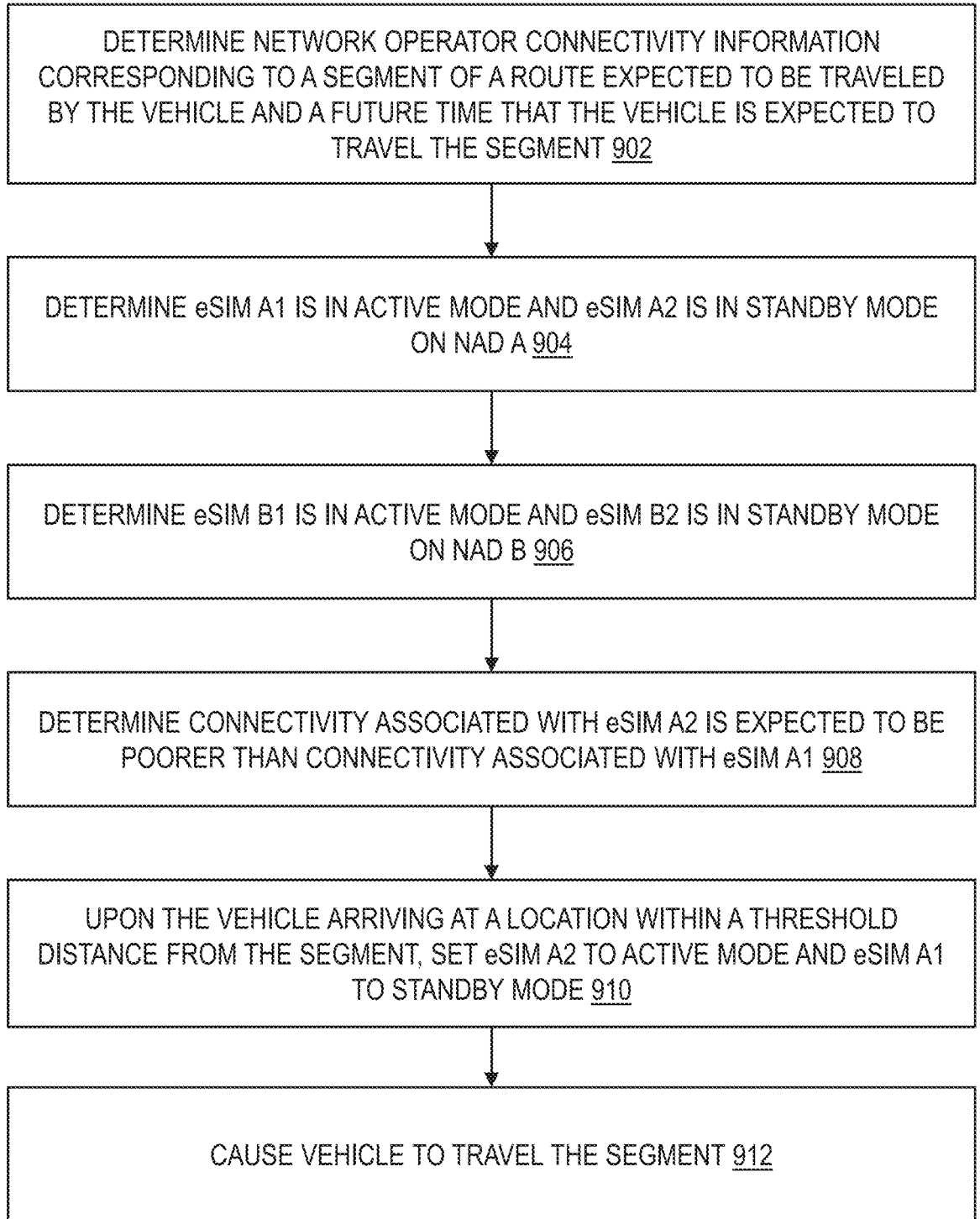

DETERMINE NETWORK OPERATOR CONNECTIVITY INFORMATION CORRESPONDING TO A SEGMENT OF A ROUTE EXPECTED TO BE TRAVELED BY THE VEHICLE AND A FUTURE TIME THAT THE VEHICLE IS EXPECTED TO TRAVEL THE SEGMENT 902

DETERMINE eSIM A1 IS IN ACTIVE MODE AND eSIM A2 IS IN STANDBY MODE ON NAD A 904

DETERMINE eSIM B1 IS IN ACTIVE MODE AND eSIM B2 IS IN STANDBY MODE ON NAD B 906

DETERMINE CONNECTIVITY ASSOCIATED WITH eSIM A2 IS EXPECTED TO BE POORER THAN CONNECTIVITY ASSOCIATED WITH eSIM A1 908

UPON THE VEHICLE ARRIVING AT A LOCATION WITHIN A THRESHOLD DISTANCE FROM THE SEGMENT, SET eSIM A2 TO ACTIVE MODE AND eSIM A1 TO STANDBY MODE 910

CAUSE VEHICLE TO TRAVEL THE SEGMENT 912

FIGURE 9

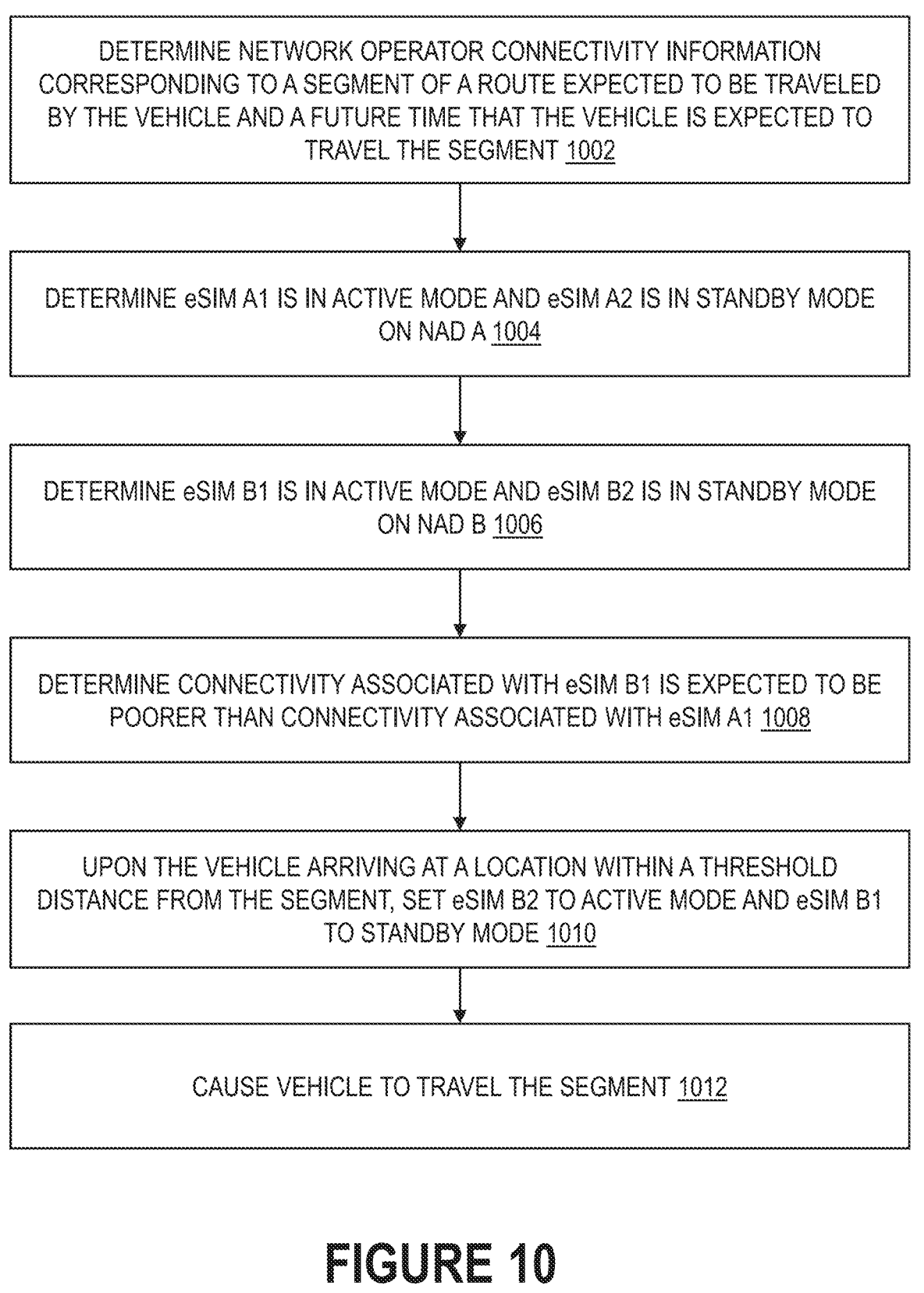

DETERMINE NETWORK OPERATOR CONNECTIVITY INFORMATION CORRESPONDING TO A SEGMENT OF A ROUTE EXPECTED TO BE TRAVELED BY THE VEHICLE AND A FUTURE TIME THAT THE VEHICLE IS EXPECTED TO TRAVEL THE SEGMENT 1002

DETERMINE eSIM A1 IS IN ACTIVE MODE AND eSIM A2 IS IN STANDBY MODE ON NAD A 1004

DETERMINE eSIM B1 IS IN ACTIVE MODE AND eSIM B2 IS IN STANDBY MODE ON NAD B 1006

DETERMINE CONNECTIVITY ASSOCIATED WITH eSIM B1 IS EXPECTED TO BE POORER THAN CONNECTIVITY ASSOCIATED WITH eSIM A1 1008

UPON THE VEHICLE ARRIVING AT A LOCATION WITHIN A THRESHOLD DISTANCE FROM THE SEGMENT, SET eSIM B2 TO ACTIVE MODE AND eSIM B1 TO STANDBY MODE 1010

CAUSE VEHICLE TO TRAVEL THE SEGMENT 1012

FIGURE 10

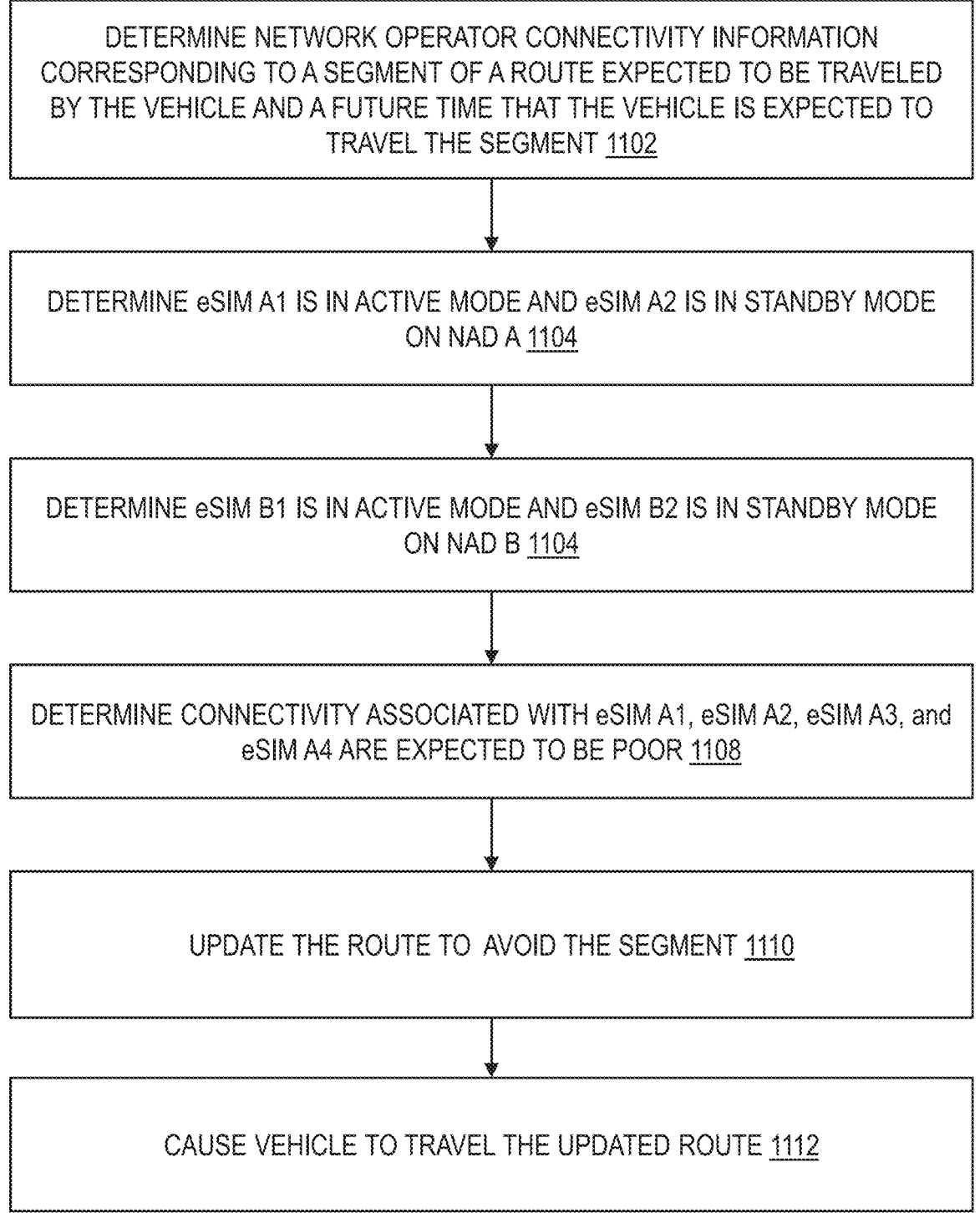

DETERMINE NETWORK OPERATOR CONNECTIVITY INFORMATION CORRESPONDING TO A SEGMENT OF A ROUTE EXPECTED TO BE TRAVELED BY THE VEHICLE AND A FUTURE TIME THAT THE VEHICLE IS EXPECTED TO TRAVEL THE SEGMENT 1102

DETERMINE eSIM A1 IS IN ACTIVE MODE AND eSIM A2 IS IN STANDBY MODE ON NAD A 1104

DETERMINE eSIM B1 IS IN ACTIVE MODE AND eSIM B2 IS IN STANDBY MODE ON NAD B 1104

DETERMINE CONNECTIVITY ASSOCIATED WITH eSIM A1, eSIM A2, eSIM A3, and eSIM A4 ARE EXPECTED TO BE POOR 1108

UPDATE THE ROUTE TO AVOID THE SEGMENT 1110

CAUSE VEHICLE TO TRAVEL THE UPDATED ROUTE 1112

FIGURE 11

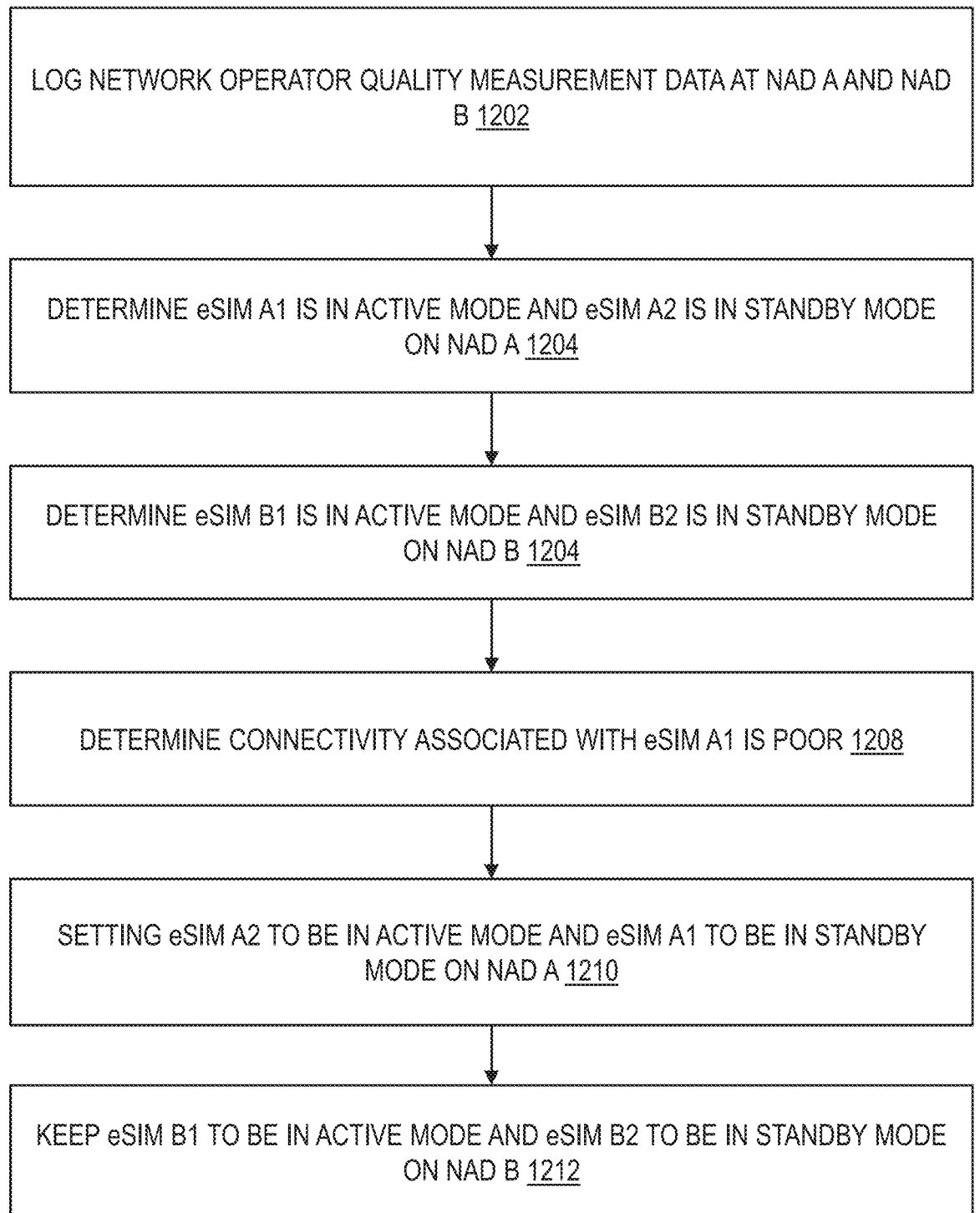

LOG NETWORK OPERATOR QUALITY MEASUREMENT DATA AT NAD A AND NAD B 1202

DETERMINE eSIM A1 IS IN ACTIVE MODE AND eSIM A2 IS IN STANDBY MODE ON NAD A 1204

DETERMINE eSIM B1 IS IN ACTIVE MODE AND eSIM B2 IS IN STANDBY MODE ON NAD B 1204

DETERMINE CONNECTIVITY ASSOCIATED WITH eSIM A1 IS POOR 1208

SETTING eSIM A2 TO BE IN ACTIVE MODE AND eSIM A1 TO BE IN STANDBY MODE ON NAD A 1210

KEEP eSIM B1 TO BE IN ACTIVE MODE AND eSIM B2 TO BE IN STANDBY MODE ON NAD B 1212

TOGGLING NETWORK OPERATOR CONNECTIVITY FOR AUTONOMOUS VEHICLES

BACKGROUND

Technical Field

The present disclosure generally relates to autonomous vehicles (AVs) and, more specifically, to toggling network operator connectivity for AVs.

INTRODUCTION

AVs, also known as self-driving cars, and driverless vehicles, may be vehicles that use multiple sensors to sense the environment and move without human input. Automation technology in AVs may enable the vehicles to drive on roadways and to accurately and quickly perceive the vehicle's environment, including obstacles, signs, and traffic lights. Autonomous technology may utilize geographical information and semantic objects (such as parking spots, lane boundaries, intersections, crosswalks, stop signs, traffic lights) for facilitating vehicles in making driving decisions. The vehicles can be used to pick-up passengers and drive the passengers to selected destinations. The vehicles can also be used to pick-up packages and/or other goods and deliver the packages and/or goods to selected destinations.

BRIEF DESCRIPTION OF THE DRAWINGS

The various advantages and features of the present technology will become apparent by reference to specific implementations illustrated in the appended drawings. A person of ordinary skill in the art will understand that these drawings show only some examples of the present technology and would not limit the scope of the present technology to these examples. Furthermore, the skilled artisan will appreciate the principles of the present technology as described and explained with additional specificity and detail through the use of the accompanying drawings.

FIG. 9 is a flow diagram illustrating an exemplary method for managing network connectivity for an AV, according to some aspects of the disclosed technology.

FIG. 10 is a flow diagram illustrating another exemplary method for managing network connectivity for an AV, according to some aspects of the disclosed technology.

FIG. 11 is a flow diagram illustrating yet another exemplary method for managing network connectivity for an AV, according to some aspects of the disclosed technology.

FIG. 12 is a flow diagram illustrating a further exemplary method for managing network connectivity for an AV, according to some aspects of the disclosed technology.

DETAILED DESCRIPTION

Figure 1:
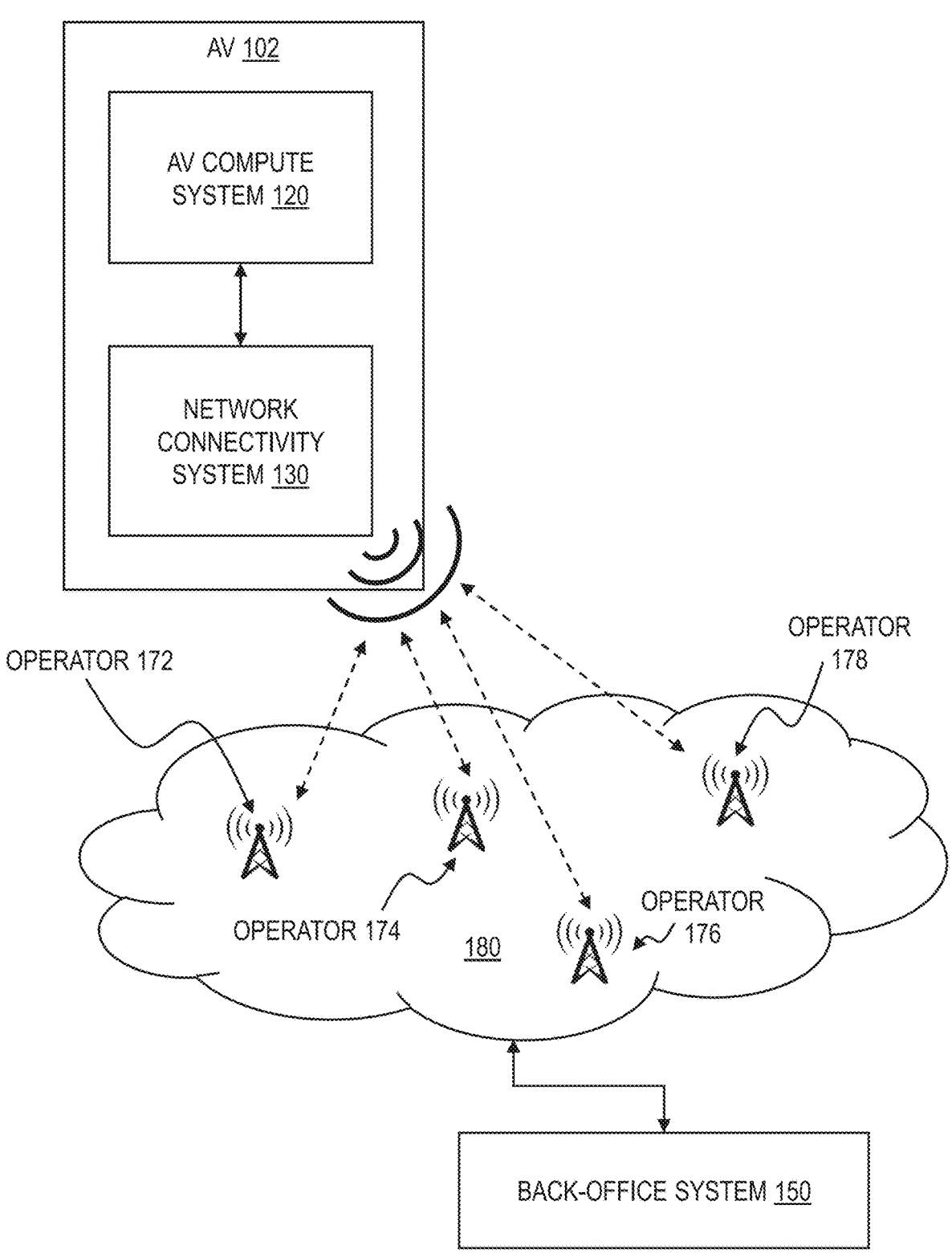
FIG. 1 illustrates a networked environment for an AV to connect with a back-office system over cellular networks, according to some embodiments of the disclosure.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form to avoid obscuring the concepts of the subject technology.

Overview

AVs can provide many benefits. For instance, AVs may have the potential to transform urban living by offering opportunities for efficient, accessible, and affordable transportation. For example, a fleet of AV's may operate in a city to offer accessible and affordable transportation for people and goods. A back-office system may manage the operations of a fleet of AVs and ensure proper operations of the fleet of AVs. The AV may transmit critical information to the back-office system over the network data connection. The back-office system may transmit critical information to the vehicle over the network data connection. AVs can routinely transmit and/or receive heartbeat notifications with the back-office system to ensure that a healthy and persistent network data connection exists between the vehicle and the back-office system. Loss of connectivity between the vehicle and the back-office system may cause the vehicle to enter a degraded state, which may in some cases result in manual retrieval of the vehicle. Loss of connectivity may be disruptive, and retrieval of the vehicle may be costly.

To ensure that at least one healthy and persistent network data connection exists, a vehicle may duplicate data traffic over two or more different network operators. For example, in the United States, there are three (major or national) cellular network operators. In some other countries there may be more cellular network operators. One way to ensure a healthy and persistent network data connection with the back-office system is to triplicate data traffic on all three cellular network operators using three network access devices (NADs). Momentary failures and or poor performance from each network operator can be tolerated because if one network operator fails or performs poorly the other two network operators can support a healthy and persistent connection with the back-office with redundant throughput. Having three or more NADs and concurrently transmitting and receiving data traffic on three or more network operators may increase parts and operational costs.

Two dual-subscriber-identity-module (SIM), dual-standby network (DS-DS) NADs may be used in an AV to actively connect with two network operators concurrently instead. Each DS-DS NAD can have two embedded SIMs (eSIMs). One eSIM is set to be in active mode, and the other eSIM is set to be in standby mode. When in an active mode, an eSIM can transmit and receive data. When in a standby mode, an eSIM can only receive data. Using two DS-DS NADs, two active data network data connections using two different network operators can be established with the back-office system. Using two NADs instead of three or more NADs can reduce cost of parts. Only duplicating data traffic on two network operators at a time can significantly reduce operational costs. A DS-DS NAD used in cell phones can change which eSIM is to be active based on a manually provided user selection. For AVs, manually provided user selections are not always available.

It may be desirable to toggle connectivity to the standby eSIM when the performance or quality of active eSIM is insufficient. Intelligently toggling or swapping may help ensure the AV has healthy, persistent, and reliable connectivity with the back-office system. An algorithm can be implemented to select which two network operators to connect with using four different eSIMs provided with two DS-DS NADs. The algorithm can intelligently, based on one or more criteria, swap or toggle which eSIM to be active mode and which other eSIM to be in standby mode for both DS-DS NADs provided on an AV. The algorithm can utilize locally measured network operator quality measurement data to make swapping decisions for the two DS-DS NADs. The algorithm can utilize network operator connectivity quality information aggregated from network operator quality measurement data collected by many AVs to make swapping decisions for the two DS-DS NADs. The network operator quality measurement data collected by many AVs may be analyzed based on location and timing. The network operator quality measurement data collected by many AVs may be visualized in map form.

The back-office system may perform routing of AVs based on the network operator connectivity quality information. The back-office system may provide network operator connectivity quality information to the AVs. In some cases, the back-office system may provide network operator connectivity quality information corresponding to segments in a route to the AVs. In some cases, the back-office system may send an instruction to swap or toggle a DS-DS NAD on an AV. In some cases, the back-office system may send an instruction to reroute an AV to avoid a segment.

The swapping or toggling can occur proactively as the AV travels on a route if an upcoming segment is expected to encounter poor connectivity. The swapping or toggling can occur in response to unpredicted loss of connectivity. In some cases, the AV is rerouted to avoid a segment all together, if connectivity is poor with all network operators on the segment.

While many examples herein are described in use with an AV, the embodiments may be implemented may be used with other types of vehicles that can transport passengers and/or cargo where healthy and persistent connectivity with a back-office system is expected. Other types of vehicles can include such as semi-autonomous vehicles, manually driven vehicles, aircrafts, trains, trams, ships, etc.

Exemplary Networked Environment for an AV and Back-Office Systems

FIG. 1 illustrates a networked environment for AV 102 to connect with a back-office system 150 over cellular networks 180, according to some embodiments of the disclosure. Portions of cellular networks 180 may be operated by different network operators. The example depicted shows operator 170, operator 174, operator 176, and operator 178.

AV 102 can include AV compute system 120. AV 102 may be equipped with various sensors to sense an environment surrounding the AV 102 and collect information (e.g., sensor data) to assist the AV 102 in making driving decisions. To that end, the collected information or sensor data may be processed and analyzed to determine a perception of the surroundings of AV 102, extract information related to navigation, and predict future motions of the AV 102 and/or other traveling agents in the vicinity of AV 102. The predictions may be used to plan a path for the AV (e.g., from a starting position to a destination). As part of planning, the AV may access map information and localize itself based on location information (e.g., from location sensors) and the map information. Subsequently, instructions can be sent to a controller to control the AV 102 (e.g., performing steering, accelerating, decelerating, braking, etc.) according to the planned path. The operations of perception, prediction, planning, and control AV 102 may be implemented using a combination of hardware and software components, together forming an AV compute system 120. AV compute system 120 can control AV 102 to complete segments of a route. A route may include a starting waypoint, an ending waypoint, and one or more connected segments (road segments) that offers a continuous path from the starting waypoint to the ending waypoint. A segment, or road segment, may form a line or trajectory between a first waypoint to a second waypoint.

During operation of AV 102, AV 102 may communicate with back-office system 150 for a variety of reasons. AV 102 may include network connectivity system 130 that allows the AV compute system 120 to communicate with back-office system 150 over cellular networks 180. AV compute system 120 may communicate with back-office system 150 at launch time to confirm AV compute system 120 is operating as expected. AV compute system 120 may report status information to back-office system 150 during operation of AV 102. Back-office system 150 may send missions or assignments to AV 102 to complete. Back-office system 150 may send traffic, weather, and/or map information to AV 102. AV 102 may communicate with back-office system 150 to obtain remote assistance for AV 102. Back-office system 150 may update software on AV compute system 120. AV compute system 120 may offload logs of events and/or sensor data to back-office system 150.

It is desirable for AV 102 to have at least one healthy and persistent connection with back-office system 150. Network connectivity system 130 may be able to connect with at least two network operators for redundancy purposes and to ensure at least one connection has sufficient performance. As AV 102 drives around a geographical area, the quality of service provided by the different network operators may vary. Ability to connect with different network operators concurrently may allow AV 102 to duplicate data traffic on connections made with the different network operators. Redundancy can help make sure that AV 102 can tolerate some loss of connectivity or degraded performance with one of the network operators at a given point in time.

To confirm that AV 102 has at least one healthy and persistent connection with back-office system 150, AV 102 and back-office system 150 may implement a heartbeat protocol or a heartbeat monitoring system. A heartbeat protocol may include an agreed-upon manner to transmit heartbeat notifications from one component/service to another. In a heartbeat protocol or heartbeat monitoring system, a component or a service may routinely (at a predetermined frequency or cadence) transmit heartbeat notifications to another component over a network connection. Heartbeat notifications can be transmitted to indicate that certain components/services are operating normally. Heartbeat notifications can be transmitted to indicate that certain components/services are available and/or reachable. If a heartbeat notification is not received by the other component for a certain period of time, heartbeat notifications rhythm/schedule changes, or data included with the heartbeat notifications fail user defined assertions, the component that is transmitting heartbeat notifications may have failed or the network connection between the two components/services is down. If irregularity is detected in the heartbeat notifications, an alert or a flag may be raised and/or an event may be logged. In some cases, network connectivity system 130 may routinely receive heartbeat notifications from back-office system 150. In some cases, AV compute system 120, e.g., through network connectivity system 130, may routinely send heartbeat notifications to the back-office system 150. Proper operation of AV 102 may depend on the network connection, and if the network connectivity system 130 has not received heartbeat notifications from the back-office system 150 for a certain period of time (e.g., one or more heartbeat periods), the AV 102 or the AV compute system 120 may enter a degraded state of operation. The AV compute system 120 may raise an error or log an event indicating that the connection with back-office system 150 has been lost, and the AV 102 may perform a procedure to place the AV in a degraded state of operation. AV 102 may gracefully pull over to a safe location and wait to be retrieved by personnel. It would be desirable to avoid losing all connectivity with the back-office system 150, because loss of connectivity can be disruptive to the operation of AV 102.

DS-DS NADs and their Operation

An eSIM is a subscriber identity module that is allowed and configured to connect with a particular network operator (and cannot connect with a different network operator). A DS-DS NAD has two eSIMs. On a DS-DS NAD, one eSIM can be selected to be in active mode, and the other eSIM can be selected to be in standby mode. When an eSIM is in an active mode, the eSIM may be used to transmit and receive network data on the cellular network provided by a network operator corresponding to the eSIM. When an eSIM is in a standby mode, the eSIM may be used to only receive network data on the cellular network provided by a network operator corresponding to the eSIM. Both eSIMs can use the same transceiver. A selector can select which eSIM is in an active mode, and which eSIM is in standby mode. The selector can toggle or swap which eSIM is in an active mode, and which eSIM is in standby mode. The selector can control which eSIM can be used to transmit network data. One eSIM may be allowed and configured to connect with a first network operator. The other eSIM may be allowed and configured to connect with a second (different) network operator.

Figure 2:
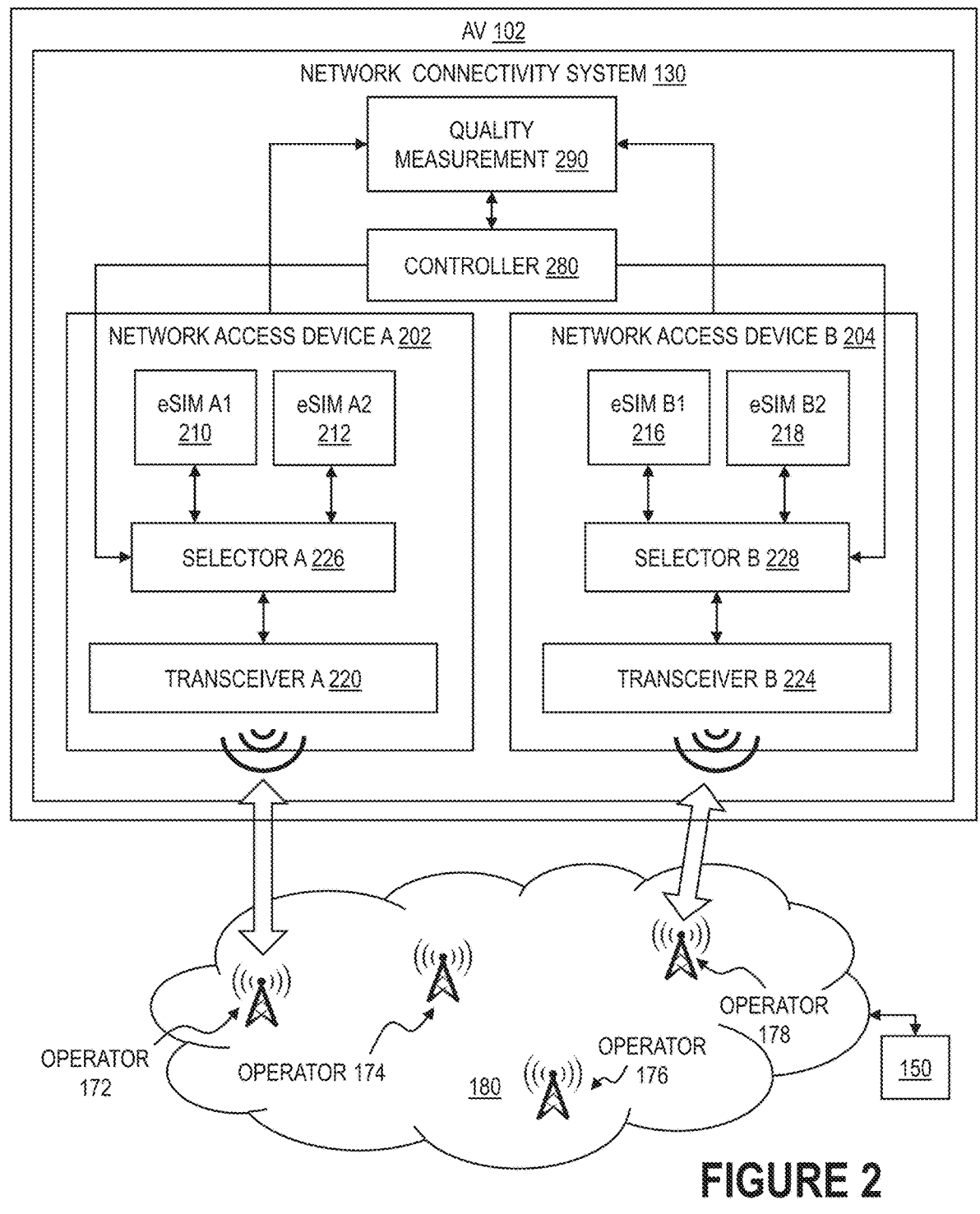
FIG. 2 illustrates an AV having a network connectivity system that includes two DS-DS NADs, according to some embodiments of the disclosure.

FIG. 2 illustrates AV 102 having network connectivity system 130 that includes two DS-DS NADs, according to some embodiments of the disclosure. AV 102 may include two DS-DS NADs: NAD A 202 and NAD B 204. NAD A 202 may include eSIM A1 210 and eSIM A2 212. NAD A 202 may include selector A 226 and transceiver A 220. Selector A 226 may select eSIM A1 210 to be in active mode, and eSIM A2 212 to be in standby mode. Selector A 226 may select eSIM A2 212 to be in active mode, and eSIM A1 210 to be in standby mode. In some cases, NAD B 204 may include eSIM B1 216 and eSIM B2 218. NAD B 204 may include selector B 228 and transceiver B 224. Selector B 228 may select eSIM B1 216 to be in active mode, and eSIM B2 218 to be in standby mode. Selector B 228 may select eSIM B2 218 to be in active mode, and eSIM B1 216 to be in standby mode. With two DS-DS NADs, network connectivity system 130 can make and maintain two active network data connections concurrently with two different network operators at a given point in time. As depicted, NAD A 202 may use one of the two eSIMs (cSIM A1 210 and eSIM A2 212) and connect to cellular network provided by operator 172, and NAD B 204 may use one of the two eSIMs (eSIM B1 216 and eSIM B2 218) and connect to cellular network provided by operator 178.

Network connectivity system 130 can include four eSIMs in total with two DS-DS NADs. The four eSIMs may have corresponding network operators. The four eSIMs may be allowed and configured to make network data connections with (or connect to) at least three different network operators. In some cases, the four eSIMs may be allowed and configured to make network data connections with three different network operators. In some cases, the four eSIMs may be allowed and configured to make network data connections with four different network operators. The ability to swap or toggle which eSIM is active and which eSIM is in standby for two DS-DS NADs allows the network connectivity system 130 to switch to use a different network operator if it is desirable to do so. Also, the ability allows the network connectivity system 130 to increase diversity of network operators being used to increase the chances that at least one of the network operators can provide a healthy and persistent connection to back-office system 150.

Network connectivity system 130 may include a quality measurement part 190 to log network operator quality measurement data at the NAD A 202 and the NAD B 204. Network operator quality measurement data may include one or more metrics that indicate the quality of the network provided by the various network operators. NAD A 202 and the NAD B 204 can log network operator quality measurement data corresponding to different network operators. Network operator quality measurement data may include round trip time (RTT) information. Network operator quality measurement data may include received signal strength indicator (RSSI) information. Network operator quality measurement data may include reference signal received power (RSRP) information corresponding to different network operators. Network operator quality measurement data may include reference signal received quality (RSRQ) information corresponding to different network operators. Network operator quality measurement data may include signal to noise ratio (SNR) information corresponding to different network operators. Network operator quality measurement data may include bit error rate (BER) information corresponding to different network operators.

Both eSIM in active mode and eSIM in standby mode can receive data from corresponding network operators of the cellular networks 180 and monitor quality of the different network operators. Therefore, eSIM A1 210 corresponding to a first network operator can measure network operator quality measurement data for the first network operator.

eSIM A2 212 corresponding to a second network operator can measure network operator quality measurement data information for the second network operator. eSIM B1 216 corresponding to a third network operator can measure network operator quality measurement data information for the third network operator. eSIM B2 218 corresponding to a fourth network operator can measure network operator quality measurement data information for the fourth network operator. Network quality may change based on the location at which the quality measurement data is made, and the time at which the quality measurement data is made. For example, network quality may be poor for a road segment during rush hour traffic on workdays, but network quality may be excellent for the road segment outside of those times. As AV 102 travels in a geographical region over time, the network operator quality measurement data being logged may have corresponding location coordinates (e.g., global positioning system coordinates) and timestamps. Location coordinates may be generated by location sensors of AV 102. Timestamps may be generated by a clock of AV 102.

Network connectivity system 130 may include controller part 280 to cause the NAD A 202 (e.g., selector A 226) to swap the eSIM A1 210 and eSIM A2 212 between being in active mode and standby mode. Controller part 280 can cause NAD B 204 to swap the eSIM B1 216 and eSIM B2 218 between being in active mode and standby mode. Controller part 280 may interface with selector A 226 to initialize selection for NAD A 202 or toggle/swap eSIMs for NAD A 202 based on a last known selection. Controller part 280 may interface with selector B 228 to initialize the selection for NAD B 204 based on a last known selection. Controller part 280 may interface with selector A 226 to make the selection for NAD A 202 or toggle/swap cSIMs for NAD A 202. Controller part 280 may interface with selector B 228 to make the selection for NAD B 204 or toggle/swap eSIMs for NAD A 202.

Controller part 280 may perform swapping on one or more of the NAD A 202 and NAD B 204 based on the network operator quality measurement data. In some cases, the controller part 280 may implement an algorithm to make the selections based on network operator quality measurement data collected by quality measurement part 290. Quality measurement part 290 may provide network operator quality measurement data to controller part 280. The algorithm may identify unpredicted or unexpected loss or degradation in network quality for one or more of the network operators on cellular networks 180 based on the network operator quality measurement data. The algorithm may then determine whether and how to toggle one of the DS-DS NADs based on the identified loss or degradation in network quality for one or more of the network operators. An exemplary method to perform toggling or swapping of eSIMs of one of the DS-DS NADs based on network operator quality measurement data is illustrated with FIG. 12. Quality measurement part 290 may log network operator quality measurement data at NAD A 202 and NAD B 204. Controller part 280 may determine a first eSIM is in active mode and a second eSIM is in standby mode on NAD A 202, and a third eSIM is in active mode and a fourth eSIM is in standby mode on NAD B 204. Controller part 280 may determine from the network operator quality measurement data that connectivity associated with the first eSIM is poor. For example, the metrics logged by quality measurement part 290 may indicate that connectivity is suddenly/unpredictably poor currently at the location of AV 102. Controller part 280 may toggle the cSIM selection on NAD A 202. Controller part 280 may set the second eSIM to be in active mode and the first eSIM to be in standby mode on NAD A 202 and keep the third eSIM in active mode and the fourth eSIM in standby mode.

Figure 4:
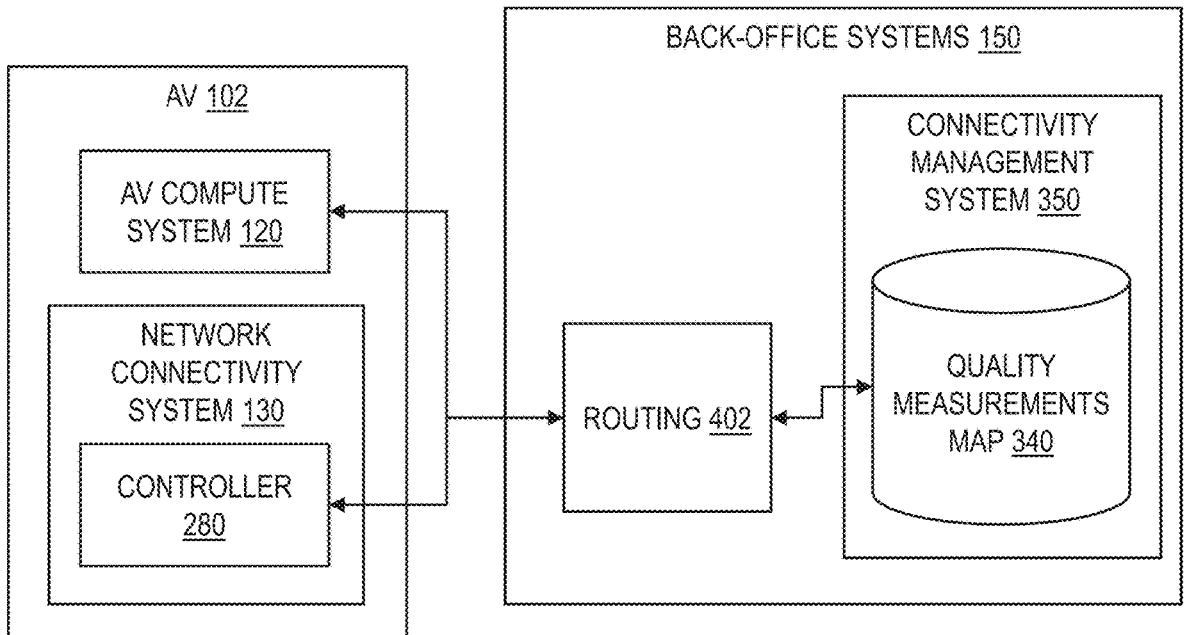
FIG. 4 illustrates an AV receiving a route and network operator connectivity quality information corresponding to segments of the route from a back-office system, according to some embodiments of the disclosure.
Figure 5:
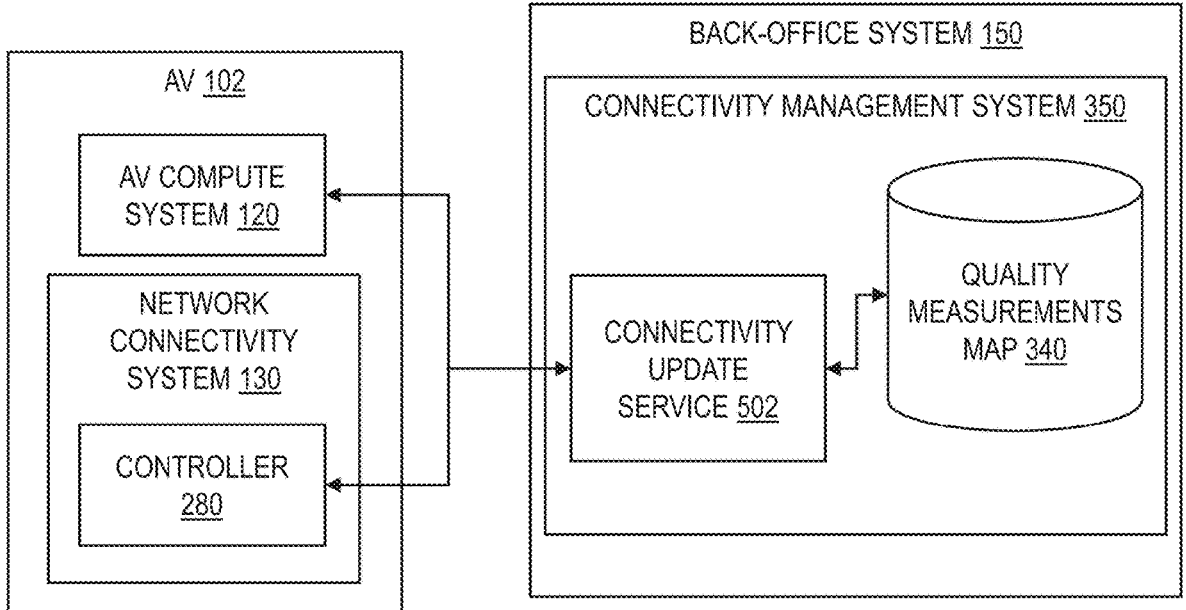
FIG. 5 illustrates an AV receiving network operator connectivity quality information from a back-office system, according to some embodiments of the disclosure.
Figure 6:
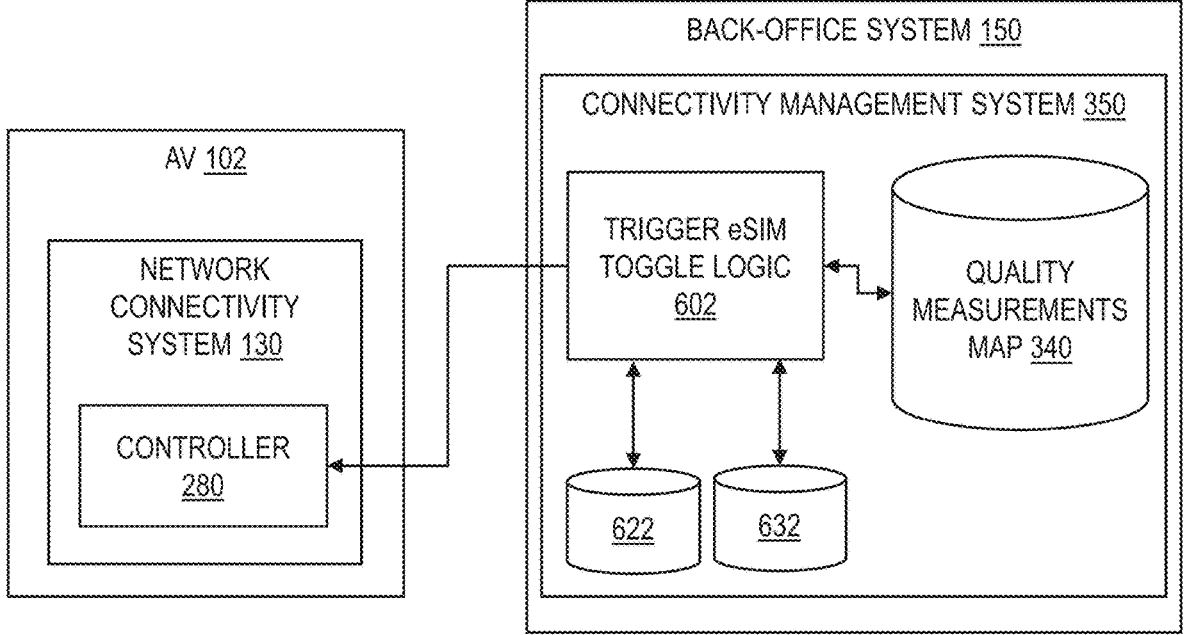
FIG. 6 illustrates an AV receiving an instruction to toggle eSIMs in one of two DS-DS NADs from a back-office system, according to some embodiments of the disclosure.

Controller part 280 may perform swapping on one or more of the NAD A 202 and NAD B 204 based on external information received at AV 102, such as external information from back-office system 150. One example of the external information may include network operator connectivity quality information corresponding to a segment of the route expected to be traveled by AV 102 and a future time that the AV 102 is expecting to travel the segment. Another example of external information may include network operator connectivity quality information from a connectivity management system in back-office system 150. Another example of external information may include a route and network operator connectivity quality information corresponding to segments of the route from a connectivity management system in back-office system 150. Another example of external information may include an instruction to toggle or swap one or more of the NAD A 202 and NAD B 204 from a connectivity management system in back-office system 150. Exemplary systems for receiving the external information are illustrated in FIGS. 4-6. Exemplary methods to perform toggling or swapping of eSIMs of one of the DS-DS NADs based on external information are illustrated with FIGS. 9-10.

To increase chances of having at least one healthy and persistent data connection with a network operator on cellular networks 180, the two eSIMs concurrently selected to be in active mode on NAD A 202 and NAD B 204 may be with different network operators at any given point in time. Controller part 280 may initialize selections for NAD A 202 and NAD B 204 to select two eSIMs with different network operators to be in active mode on NAD A 202 and NAD B 204. Controller part 280 may ensure the toggling or swapping algorithm implemented thereon to not swap or toggle the selections for NAD A 202 and/or NAD B 204 in a way that would result in having two eSIMs with the same network operators to be in active mode on NAD A 202 and NAD B 204. Controller part 280 may ensure the toggling or swapping algorithm implemented thereon to swap or toggle the selections for NAD A 202 and/or NAD B 204 in a way that would result in having two eSIMs with different network operators to be in active mode on NAD A 202 and NAD B 204.

Exemplary eSIM selections made by controller part 280 for the two DS-DS NADs may be as follows:

TABLE 1

| EXEMPLARY eSIM SELECTIONS FOR NAD A 202 AND NAD B 204 | | | |
|---|---|---|---|
| NAD A 202 eSIMs | NAD A 202 eSIMs selections | NAD B 204 eSIMs | NAD B 204 eSIM selections |
| eSIM A1 210 Operator 172 | ACTIVE | eSIM B1 216 Operator 176 | ACTIVE |
| eSIM A2 212 Operator 174 | STANDBY | eSIM B1 218 Operator 174 | STANDBY |

In the above example, there are three network operators to which four eSIMs may connect. AV 102 may concurrently transmit data traffic over a first data connection made using operator 172 and a second data connection made using operator 176. The eSIM selections may be initialized based on last known selections. For example, AV 102 was parked and was previously set to make eSIM A1 210 with operator 172 and eSIM B1 216 with operator 176 be in active mode. The eSIM selections may be stored as memory pointers to a data structure identifying the four eSIMs. When AV 102 launches, the eSIM selections may be set by controller part 280 based on the last known selections (e.g., using the same memory pointers) to minimize network attachment time.

If controller part 280 determines that quality of the connection provided by operator 176 is or is expected to be suboptimal, controller part 280 may toggle NAD B 204 eSIM selections, which can result in the following eSIM selections:

TABLE 2

| NAD A 202 eSIMs | NAD A 202 eSIMs selections | NAD B 204 eSIMs | NAD B 204 eSIM selections |
|---|---|---|---|
| eSIM A1 210 Operator 172 | ACTIVE | eSIM B1 216 Operator 176 | STANDBY |
| eSIM A2 212 Operator 174 | STANDBY | eSIM B1 218 Operator 174 | ACTIVE |

EXEMPLARY eSIM SELECTIONS FOR NAD A 202 AND NAD B 204 (AFTER TOGGLING/SWAPPING SELECTIONS FOR NAD B 204)

In the above illustrated eSIM selections, AV 102 may concurrently transmit data traffic over a first data connection made using operator 172 and a second data connection made using operator 174.

Network attachment time for an eSIM, e.g., for an eSIM to be in standby mode then changes to be in active mode, may take about ten seconds. For a DS-DS NAD that is being toggled or swapped, the DS-DS NAD would have no connectivity for the duration of network attachment time. In some cases, controller part 280 may toggle or swap eSIM selections only for one of the two DS-DS NADs at a time, because if both are toggled or swapped, the network connectivity system 130 of AV 102 would lose connectivity for the duration of network attachment time (e.g., AV 102 would have no connectivity for both DS-DS NADs for 10 seconds). Exemplary System to Collect Network Quality Measurement Data from AVs When a fleet of AVs are driving around a geographical area over many hours and days, each AV in the fleet can collect a lot of network quality measurement data spanning the geographical area and across time. The network quality measurement data from the fleet of AVs may be collected, aggregated, filtered, and/or analyzed to form network operator connectivity quality information. Network operator connectivity quality information may be organized in terms of segments of a map and based on time. Network operator connectivity quality information can be visualized on a map, e.g., using a heat map or a color-coded map.

Figure 3:
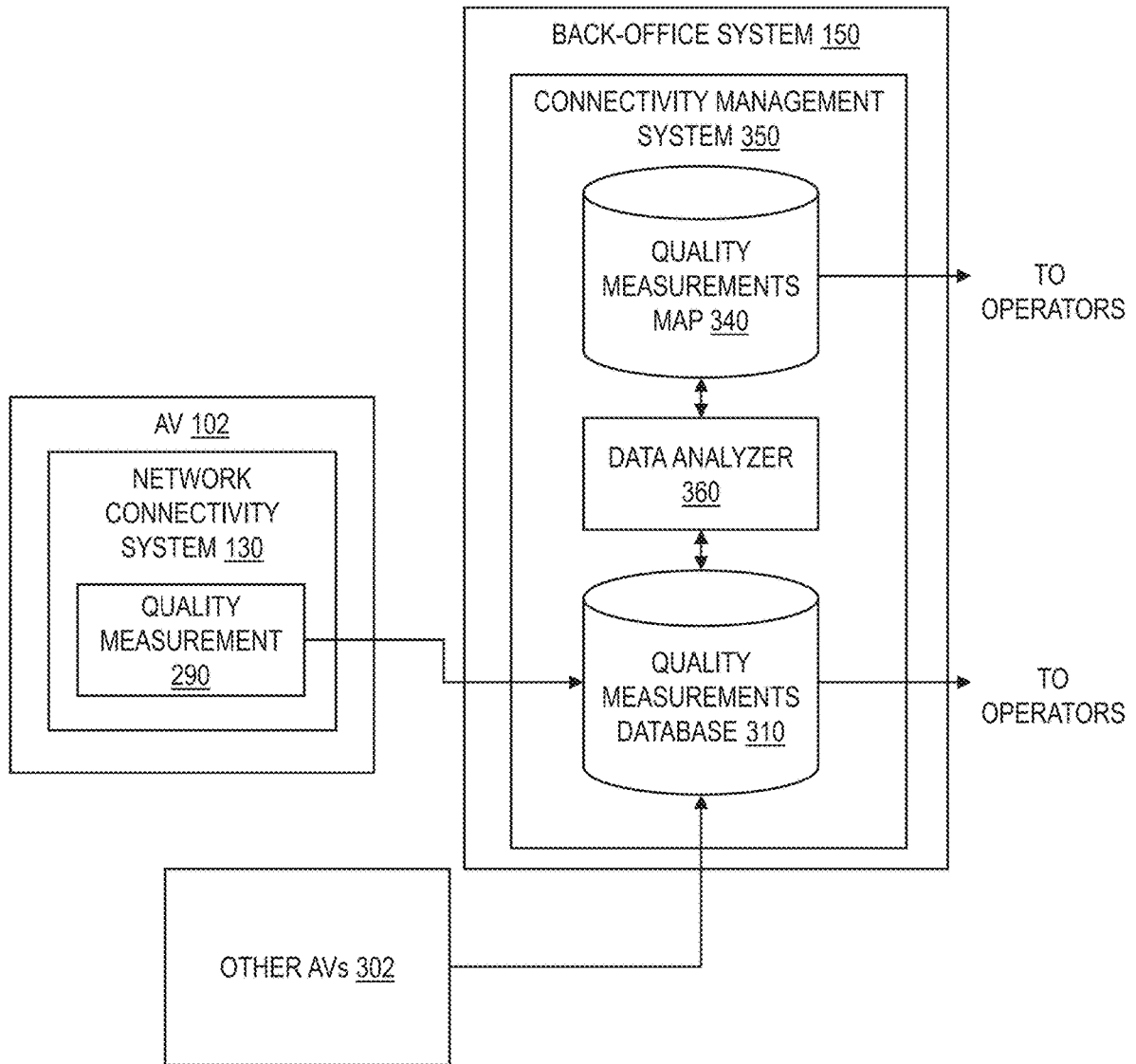
FIG. 3 illustrates an AV collecting and providing network quality measurement data to a connectivity management system in a back-office system, according to some embodiments of the disclosure.

FIG. 3 illustrates an AV 102 collecting and providing network quality measurement data to connectivity management system 350 in back-office system 150, according to some embodiments of the disclosure. AV 102, and other AVs 302 (together forming a fleet of AVs) may collect network quality measurement data in manners illustrated in FIG. 2. Other AVs 302 may implement similar or same features as AV 102. Quality measurement part 290 of AV 102 may log network operator quality measurement data at the two DS-DS NADs for various network operators. Quality measurement part 290 may transmit the network operator quality measurement data to back-office system 150, such as connectivity management system 350. The network operator quality measurement data from a fleet of AVs, such as AV 102 and other AVs 302, may be stored in quality measurements database 310.

Network operator quality measurement data may include one or more metrics that indicate the quality of the network provided by the various network operators. The metrics may be recorded by quality measurement part 290 with location coordinates and timestamps. Connectivity management system 250 may include quality measurements database 310 to store the network operator quality measurement data.

Connectivity management system 250 may include data analyzer 360. The network operator quality measurement data stored in quality measurements database 310, e.g., metrics recorded by quality measurement part 290, may be processed against one or more thresholds by data analyzer 360. The metrics may be compared by data analyzer 360 against thresholds or other criteria to determine and log failure events of various network operators. Failure events may have corresponding location coordinates and timestamps.

In some cases, thresholds or criteria may be set differently depending on the desired level of quality or performance of the network. Certain network data connections being made with back-office system 150 may demand higher performing networks than other network data connections. Data analyzer 360 may analyze the network operator quality measurement data with different thresholds or criteria.

Failure events represent samples being taken by a fleet of AVs about the performance of various network operators across a geographical region and over time. The samples may be processed by data analyzer 360 to determine whether a particular network operator underperforms (or has poor performance) for certain road segments, and time frames during which the network operator underperforms. Samples may be noisy. Samples may not cover every location in the geographical region. Samples may not capture information across all time instants. Samples may be sparse across the geographical region and across time. Failures represented by the samples may be transient and non-deterministic due to temporary obstructions, network updates, or random traffic overload, etc. Data analyzer 360 may process (e.g., filter) the samples to determine clustered, repeatable, or persistent failures for different road segments and time frames for various network operators. Time frames may be defined based on 15-minute increments over a period of one week. For example, every day during commute hours, a certain intersection may have consistently poor throughput for one network operator due to all subscribers to the network operator in that area connecting to a single cell tower. This same intersection may offer an excellent connection to the network operator during the weekend.

Network connectivity quality or performance for various network operators may change over time, due to temporary network failures or new improvements made on the network infrastructure. Data analyzer 360 may process a time window of network operator quality measurement data from the AVs. Data analyzer 360 may average data over a certain time window (e.g., a number of months) to reduce overall noise and variability of the network. Samples or identified failures may have corresponding expiration dates. Organized data in quality measurements map 340 may have corresponding expiration dates or a time window of validity. Expiration or validity time window allows controller parts that are using this information for swapping/toggling or rerouting to disregard information that has expired or is no longer valid. Detected network improvements (or information from network operators) may be incorporated into quality measurements map 340 to remove or overwrite previously detected failures quickly to avoid unnecessary swapping or toggling of eSIM selections on DS-DS NADs.

Connectivity management system 250 may include quality measurements map 340. Output of data analyzer 360 processing the samples may be stored in quality measurements map 320. which may organize persistent failures for various network operators based on road segments and time frames to which the failures are valid. In some cases, the persistent failures or underperformance of various network operators stored in quality measurements map 340 may be visualized in a graphical user interface that can convey and communicate when and where a network operator may be underperforming. The graphical user interface may include a heat map or a color-coded map of a geographical region. The visualization may adjust or be updated visually based on a specified time. A user may adjust a specified time by inputting a time frame or adjusting a time window using a user interface element on the graphical user interface (e.g., a sliding control).

Data in quality measurements database 310 and/or data in quality measurements map 340 may be shared with one or more network operators to inform network operators where improvements are needed.

Exemplary System to Receive Network Operator Connectivity Data from a Back-Office System FIG. 4 illustrates AV 102 receiving a route and network operator connectivity quality information corresponding to segments of the route from back-office system 150, according to some embodiments of the disclosure. In some embodiments, routing part 402 of back-office system 150 may perform routing, e.g., determining a route for AV 102 to complete. In some cases, routing part 402 may optimize and determine a route for AV 102 to complete based on factors such as distance, cost, rider preferences, traffic information, weather information, specified waypoints, etc. In some cases, routing part 402 may optimize and determine a route for the AV 102 based further on data in quality measurements map 340. Once a route is determined, routing part 402 may provide the route to AV compute system 120 of AV 102 for the AV 102 to complete. Routing part 402 may determine network operator connectivity quality information corresponding to segments in the route (e.g., from quality measurements map 340) and provide the network operator quality connectivity quality information corresponding to the segments in the route to controller part 280 of AV 102.

AV 102 may receive the route and network operator quality connectivity quality information corresponding to the segments in the route from routing part 402 of back-office system 150. AV 102, equipped with a route and network operator quality connectivity quality information corresponding to the segments in the route, may toggle or swap eSIM selections according to the route and network operator quality connectivity quality information corresponding to the segments in the route while AV 102 completes the route. In some cases, AV 102 may reroute or update the route based on network operator quality connectivity quality information corresponding to the segments in the route.

The network operator connectivity quality information can include information indicating at least one network operator is underperforming, e.g., for a particular road segment at a particular time of day. The network operator connectivity quality information can include information ranking performance of the network operators, e.g., for a particular road segment at a particular time of day. The network operator connectivity quality information can include a time frame that the network operator connectivity quality information is valid. The network operator connectivity quality information can include one or more segments and one or more times of day to which the network operator connectivity quality information corresponds.

FIG. 5 illustrates AV 102 receiving network operator connectivity quality information from a back-office system, according to some embodiments of the disclosure. In some embodiments, connectivity update service 502 in connectivity management system 350 of back-office system 150 may provide updates or last known failures or data from quality measurements map 340 to AV 102. AV compute system 120 and/or controller part 280 may receive network operator connectivity quality information from connectivity update service 502 back-office system 150. AV 102 may maintain a database of network operator connectivity quality information as AV 102 travels around a geographical area.

AV 102, equipped with network operator quality connectivity quality information, may toggle or swap eSIM selections according to network operator quality connectivity quality information while AV 102 completes a route. In some cases, AV 102 may reroute or update the route based on network operator quality connectivity quality information maintained in AV 102.

The network operator connectivity quality information can include information indicating at least one network operator is underperforming, e.g., for a particular road segment at a particular time of day. The network operator connectivity quality information can include information ranking performance of the network operators, e.g., for a particular road segment at a particular time of day. The network operator connectivity quality information can include a time frame that the network operator connectivity quality information is valid. The network operator connectivity quality information can include an update to the network operator connectivity quality information. The network operator connectivity quality information can include one or more segments and one or more times of day to which the network operator connectivity quality information corresponds. The network operator connectivity quality information can include one or more geofences where at least one of the network operators is underperforming. The network operator connectivity quality information can include one or more geofences with corresponding rankings of the performance of the network operators. The network operator connectivity quality information can include one or more geofences indicating keep-out zones due to all network operators failing in the area.

Exemplary System to Receive Instruction to Toggle/Swap eSIMs on One of the DS-DS NADs from a Back-Office System FIG. 6 illustrates an AV receiving an instruction to toggle eSIMs in one of two DS-DS NADs from a back-office system, according to some embodiments of the disclosure. In some embodiments, trigger eSIM toggle logic part 602 in connectivity management system 350 of back-office system 150 may remotely trigger controller part 280 on AV 102 to toggle/swap eSIM selections on a DS-DS NAD. Connectivity management system 250 may monitor or track locations of AVs in a fleet of AVs in location information 622. Connectivity management system 250 may monitor or track current eSIM selections/profiles of AVs in a fleet of AVs in eSIM profiles 632. Trigger eSIM toggle logic part 602 may determine a location of AV 102 from location information 622 and current eSIM selections from eSIM profiles 632 and correlate the location of AV 102 against the data in quality measurements map 340. If toggling/swapping is desirable and can prevent total loss of connectivity for AV 102, trigger eSIM toggle logic part 602 may determine an instruction to toggle one of the DS-DS NADs in network connectivity system 130 of AV 102. Controller part 280 of AV 102 may receive an instruction from trigger eSIM toggle logic part 602 in connectivity management system 350 of back-office system 150 to toggle/swap eSIM selections on a DS-DS NAD. For example, controller part 280 may set the one of the eSIMs (in standby mode) to be in active mode and the other one of the eSIMs (in active mode) to be in standby mode on one of the DS-DS NADs in network connectivity system 130.

Figure 7:
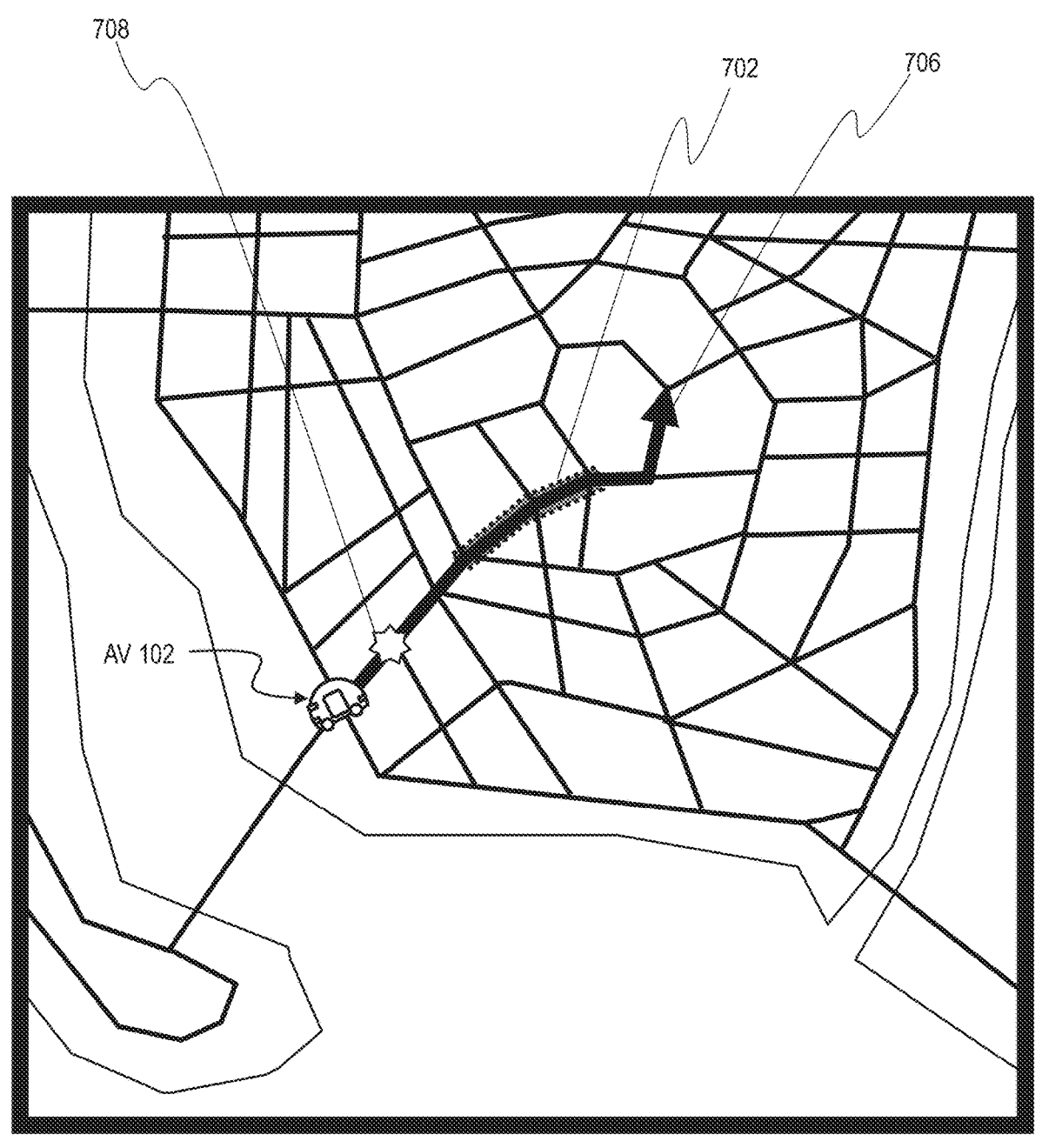
FIG. 7 depicts an exemplary AV swapping or toggling eSIMs in one of two DS-DS NADs before traveling a segment in a route, according to some embodiments of the disclosure.

Exemplary Scenarios where an AV Toggle/Swap eSIMs on One of the DS-DS NADs Before Entering a Segment FIG. 7 depicts AV 102 swapping or toggling eSIMs in one of two DS-DS NADs (proactively) before traveling a segment 702 in a route 706, according to some embodiments of the disclosure. A map of a geographical area is depicted in FIG. 7, and AV 102 at a location shown in the map is completing route 706. AV 102 may determine network operator connectivity quality information corresponding to segment 702 of route 706 expected to be traveled by AV 102 and a future time that AV 102 is expected to travel the segment 702. AV 102 may determine that a first eSIM is in active mode and a second eSIM is in a standby mode on a first DS-DS NAD of the AV 102. AV 102 may determine that a third eSIM is in active mode and a fourth eSIM is in a standby mode on a second DS-DS NAD of the AV 102. AV 102 may determine from the network operator connectivity quality information connectivity corresponding to segment 702 of route 706 expected to be traveled by AV 102 and a future time that AV 102 is expected to travel the segment 702 that connectivity associated with the first eSIM is expected to be poorer than connectivity associated with the second eSIM (or connectivity associated with the first eSIM is expected to be poor or is expected to fail, or connectivity associated with the second eSIM is expected to be better than the connectivity associated with the first eSIM). In other words, for one of the DS-DS NAD, the network operator corresponding to an eSIM in standby mode may offer better network connectivity than the network operator corresponding to an eSIM in active mode. The network operator connectivity quality information connectivity corresponding to segment 702 of route 706 expected to be traveled by AV 102 and the future time that AV 102 is expected to travel the segment 702 may indicate that it may be desirable to toggle/swap the first DS-DS NAD cSIM selection proactively, because the network corresponding to the second eSIM may be less congested in segment 702 at the future time. Upon the AV 102 arriving at a location 708 within a threshold distance from the segment 702, setting the second eSIM to be in active mode and the first eSIM to be in standby mode on the first DS-DS NAD. AV 102 may complete route 706 through segment 702 (AV 102 may travel segment 702) while the second eSIM is in active mode and the first eSIM is in standby mode on the first DS-DS NAD.

In some cases, the threshold distance is determined such that the AV does not toggle or swap eSIM selection too early or too late, or unnecessarily. The threshold distance may be set based on network attachment time (e.g., how long it takes to toggle or swap eSIM selections on a DS-DS NAD) and how quickly AV 102 is expected to reach the segment with poor connectivity for one of the network providers. AV 102 may determine the threshold distance based on a speed limit of the segment 702 (or a segment leading up to segment 702) and an expected time to change modes of eSIMs in the first DS-DS NAD (e.g., network attachment time). This way AV 102 may be connected using the second eSIM on the first DS-DS NAD (and the third eSIM on the second DS-DS NAD) just before arriving at segment 702 (or just in time upon arriving at segment 702).

In some cases, both eSIMs in active mode on the two DS-DS NADs may be underperforming in segment 702. For example, AV 102 may determine from the network operator connectivity quality information connectivity corresponding to segment 702 of route 706 expected to be traveled by AV 102 and a future time that AV 102 is expected to travel the segment 702 that connectivity associated with the second eSIM is expected to be better than connectivity associated with the first eSIM and connectivity associated with the third eSIM (or connectivity associated with the first eSIM and connectivity associated with the third eSIM are expected to be poor or are expected to fail, or connectivity associated with the first eSIM and connectivity associated with the third eSIM are expected to be poorer than the connectivity associated with the second eSIM). Upon AV arriving at location 708, AV may keep the third eSIM in active mode and the fourth cSIM in standby mode on the second DS-DS NAD (e.g., not toggle the second DS-DS NAD). Not toggling both DS-DS NADs avoid losing all connectivity on both DS-DS NADs for the duration of network attachment time.

In some cases, AV 102 may determine from the network operator connectivity quality information corresponding to segment 702 of route 706 expected to be traveled by AV 102 and a future time that AV 102 is expected to travel the segment 702 that that connectivity associated with the third eSIM is expected to be poorer than connectivity associated with the first eSIM. In other words, one of the active eSIMs on the two DS-DS NADs may be expected to perform better than the other active eSIMs. In this situation, the AV 102 may benefit from toggling the DS-DS NAD with the active eSIM that is expected to perform poorly or fail in segment 702 at the future time to try using the standby eSIM (e.g., to create diversity in the eSIM selections). Upon AV 102 arriving at location 708, AV 102 may set the fourth eSIM to be in active mode and the third eSIM to be in standby mode on the second DS-DS NAD. AV 102 may travel segment 702 while the fourth eSIM is in active mode and the third eSIM is in standby mode on the second DS-DS NAD. The eSIM selection on the first DS-DS NAD is not toggled/swapped. The eSIM selection on the second DS-DS NAD is toggled/swapped.

In some cases, the toggling/swapping decision may be determined remotely in a back-office system, and the back-office system may trigger AV 102 to toggle/swap eSIM selection on one of the DS-DS NADs. This technique is illustrated in FIG. 6.

Exemplary toggling/swapping techniques are illustrated in FIGS. 9-10.

Figure 8:
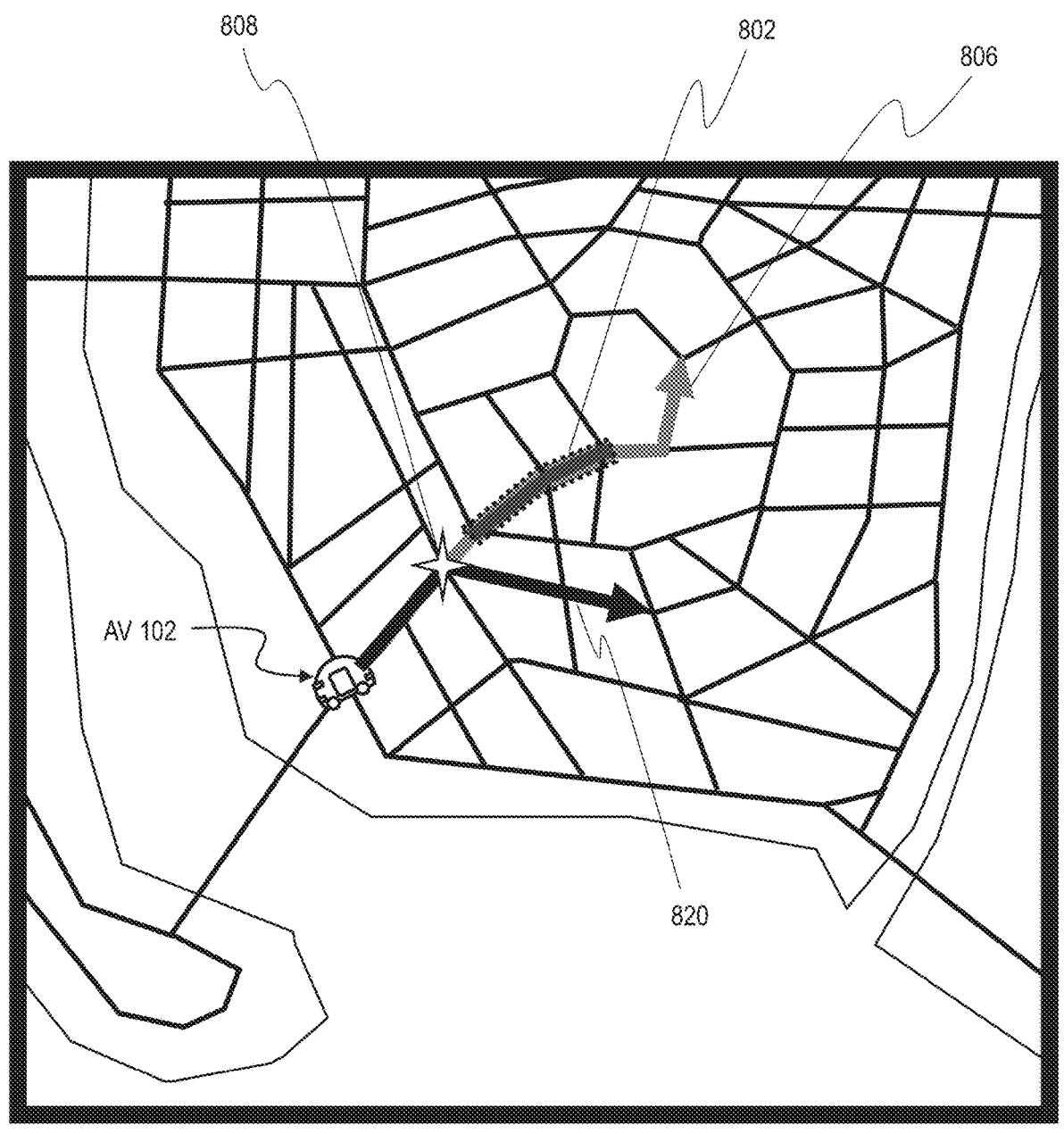
FIG. 8 depicts an exemplary AV rerouting to avoid a segment having poor connectivity with all network operators, according to some embodiments of the disclosure.

Exemplary Scenarios where an AV is Rerouted to Avoid a Segment with Poor Connectivity with Most or all Network Operators FIG. 8 depicts exemplary AV 102 rerouting to avoid a segment 802 having poor connectivity with all network operators, according to some embodiments of the disclosure. A map of a geographical area is depicted in FIG. 8, and AV 102 at a location shown in the map is completing route 806 that has segment 802. AV 102 may determine network operator connectivity quality information corresponding to segment 802 of a route expected to be traveled by AV 102 and a future time that AV 102 is expected to travel the segment 702. AV 102 may determine that a first eSIM is in active mode and a second eSIM is in a standby mode on a first DS-DS NAD of the AV 102. AV 102 may determine that a third eSIM is in active mode and a fourth eSIM is in a standby mode on a second DS-DS NAD of the AV 102. AV 102 may determine from the network operator connectivity quality information connectivity corresponding to segment 702 of route 706 expected to be traveled by AV 102 and a future time that AV 102 is expected to travel the segment 702 that connectivity associated with the first eSIM, connectivity with the second eSIM, connectivity with the third eSIM, and connectivity with the fourth eSIM are expected to be poor. In other words, all network operators may have poor network performance in that segment 802 at the future time. AV 102 may update route 806 to avoid segment 802. AV 102 may determine an updated route 820 that avoids segment 702 altogether. AV 102 may travel the updated route 820 and avoid traveling through segment 702. At point 808, AV 102 may diverge from route 806 to travel updated route 820. Avoiding segment 702 by rerouting can reduce the chance that AV 102 would lose connectivity with the back-office system and enter a degraded state.

In some cases, the rerouting may be determined remotely in a back-office system, and the back-office system may update the route and send an updated route to the AV 102. This technique is illustrated in FIG. 11.

Exemplary Methods for Managing Network Connectivity for an AV

FIG. 9 is a flow diagram illustrating an exemplary method for managing network connectivity for an AV, according to some aspects of the disclosed technology. The method may be implemented within the systems illustrated in FIGS. 1-6. In 902, network operator connectivity quality information corresponding to a segment of a route expected to be traveled by the vehicle and a future time that the vehicle is expected to travel the segment may be determined. In 904, a first embedded subscriber identity module (eSIM) may be determined to be in active mode and a second eSIM may be determined to be in a standby mode on a first network access device of the vehicle. In 906, a third eSIM may be determined to be in active mode and a fourth eSIM may be determined to be in standby mode on a second network access device of the vehicle. In 908, from the network operator connectivity quality information, connectivity associated with the first eSIM may be determined (or may be expected) to be poorer than connectivity associated with the second eSIM. In 910, upon the vehicle arriving at a location within a threshold distance from the segment, the second eSIM may be set in active mode and the first eSIM may be set in standby mode on the first network access device. In 912, the vehicle may travel the segment while the second eSIM is in active mode and the first eSIM is in standby mode on the first network access device.

FIG. 10 is a flow diagram illustrating another exemplary method for managing network connectivity for an AV, according to some aspects of the disclosed technology. The method may be implemented within the systems illustrated in FIGS. 1-6. In 1002, network operator connectivity quality information corresponding to a segment of a route expected to be traveled by the vehicle and a future time that the vehicle is expected to travel the segment may be determined. In 1004, a first embedded subscriber identity module (eSIM) may be determined to be in active mode and a second eSIM may be determined to be in a standby mode on a first network access device of the vehicle. In 1006, a third eSIM may be determined to be in active mode and a fourth eSIM may be determined to be in standby mode on a second network access device of the vehicle. In 1008, from the network operator connectivity quality information, connectivity associated with the third eSIM may be determined (or may be expected) to be poorer than connectivity associated with the first eSIM. In 1010, upon the vehicle arriving at a location within a threshold distance from the segment, the fourth eSIM may be set in active mode and the third eSIM may be set in standby mode on the second network access device. In 1012, the vehicle may travel the segment while the fourth eSIM is in active mode and the third eSIM is in standby mode on the second network access device.

FIG. 11 is a flow diagram illustrating yet another exemplary method for managing network connectivity for an AV, according to some aspects of the disclosed technology. The method may be implemented within the systems illustrated in FIGS. 1-6. In 1102, network operator connectivity quality information corresponding to a segment of a route expected to be traveled by the vehicle and a future time that the vehicle is expected to travel the segment may be determined. In 1104, a first embedded subscriber identity module (eSIM) may be determined to be in active mode and a second eSIM may be determined to be in a standby mode on a first network access device of the vehicle. In 1106, a third eSIM may be determined to be in active mode and a fourth eSIM may be determined to be in standby mode on a second network access device of the vehicle. In 1108, from the network operator connectivity quality information, connectivity associated with the first eSIM, connectivity with the second eSIM, connectivity with the third eSIM, and connectivity with the fourth eSIM may be determined (or may be expected) to be poor. In 1110, a route may be updated to avoid the segment. In 1112, the vehicle may travel the updated route.

FIG. 12 is a flow diagram illustrating a further exemplary method for managing network connectivity for an AV, according to some aspects of the disclosed technology. The method may be implemented within the systems illustrated in FIGS. 1-6. In 1202, network operator quality measurement data may be logged at a first network access device and a second network access device of the vehicle. In 1204, a first embedded subscriber identity module (eSIM) may be determined to be in active mode and a second eSIM may be determined to be in a standby mode on a first network access device of the vehicle. In 1206, a third eSIM may be determined to be in active mode and a fourth eSIM may be determined to be in standby mode on a second network access device of the vehicle. In 1210, from network operator quality measurement data, connectivity associated with the first eSIM may be determined to be poor. In 1212, the second eSIM may be set to be in active mode, and the first eSIM may be set to be in standby mode on the first network access device. In 1212, the third eSIM may be kept in active mode and the fourth eSIM may be kept in standby mode on the second network access device.

Exemplary AV Management System

Figure 13:
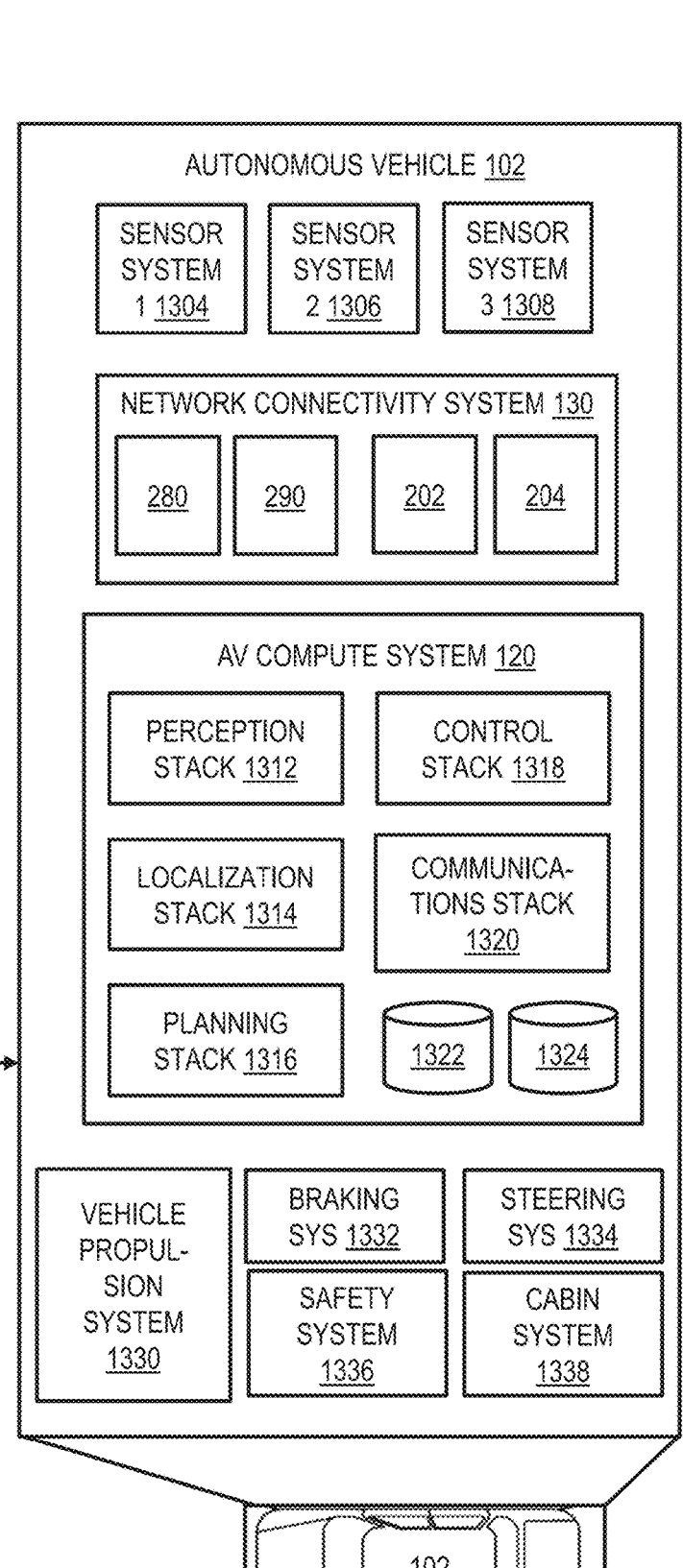
FIG. 13 illustrates an exemplary system environment that may be used to facilitate AV fleet operations, according to some aspects of the disclosed technology.

Turning now to FIG. 13, this figure illustrates an example of an AV fleet management system 1300 that may be used to facilitate AV fleet operations, in which some of the aspects of the present disclosure can be implemented. One of ordinary skill in the art will understand that, for the AV fleet management system 1300 and any system discussed in the present disclosure, there may be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV fleet management system 1300 includes an AV 102, a back-office system 150 (e.g., implemented one or more data centers), and a client computing device 1370. The AV 102, and the back-office system 150 may communicate with one another over one or more networks (not shown), such as a public network (e.g., the Internet, an Infrastructure as a Service (IaaS) network, a Platform as a Service (PaaS) network, a Software as a Service (SaaS) network, another Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

AV 102 may navigate about roadways without a human driver based on sensor signals generated by multiple sensor systems 1304, 1306, and 1308. The sensor systems 1304-1308 may include different types of sensors and may be arranged about the AV 102. For instance, the sensor systems 1304-1308 may comprise Inertial Measurement Units (IMUs), cameras (e.g., still image cameras, video cameras, etc.), light sensors (e.g., LIDAR systems, ambient light sensors, infrared sensors, etc.), RADAR systems, a Global Navigation Satellite System (GNSS) receiver, (e.g., Global Positioning System (GPS) receivers), audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 1304 may be a camera system, the sensor system 1306 may be a LIDAR system, and the sensor system 1308 may be a RADAR system. Other embodiments may include any other number and type of sensors.

AV 102 may also include several mechanical systems that may be used to control, maneuver, or operate AV 102. For instance, mechanical systems may include vehicle propulsion system 1330, braking system 1332, steering system 1334, safety system 1336, and cabin system 1338, among other systems. Vehicle propulsion system 1330 may include an electric motor, an internal combustion engine, or both. The braking system 1332 may include an engine brake, a wheel braking system (e.g., a disc braking system that utilizes brake pads), hydraulics, actuators, and/or any other suitable componentry configured to assist in decelerating AV 102. The steering system 1334 may include suitable componentry configured to control the direction of movement of the AV 102 during navigation. Safety system 1336 may include lights and signal indicators, a parking brake, airbags, and so forth. The cabin system 1338 may include cabin temperature control systems, in-cabin entertainment systems, and so forth. In some embodiments, the AV 102 may not include human driver actuators (e.g., steering wheel, handbrake, foot brake pedal, foot accelerator pedal, turn signal lever, window wipers, etc.) for controlling the AV 102. Instead, the cabin system 1338 may include one or more client interfaces (e.g., GUIs, Voice User Interfaces (VUIs), etc.) for controlling certain aspects of the mechanical systems 1330-1338.

AV 102 may include AV compute system 120 that is in communication with the sensor systems 1304-1308, the mechanical systems 1330-1338, the back-office system 150, and the client computing device 1370, among other systems. The AV compute system 120 may include one or more processors and memory, including instructions that may be executed by the one or more processors. The instructions may make up one or more software stacks or components responsible for controlling the AV 102; communicating with the back-office system 150, the client computing device 1370, and other systems; receiving inputs from riders, passengers, and other entities within the AV's environment; logging metrics collected by the sensor systems 1304-1308; and so forth. In this example, the compute system 120 includes a perception stack 1312, a mapping and localization stack 1314, a planning stack 1316, a control stack 1318, a communications stack 1320, an HD geospatial database 1322, and an AV operational database 1324, among other stacks and systems. Additional details relating to AV compute system 120 are illustrated in FIGS. 1-6.

AV 102 may include network connectivity system 130, control part 280, quality measurement part 290, NAD A 202, and NAD B 204. These components are illustrated in FIGS. 1-6.

Perception stack 1312 may enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 1304-1308, the mapping and localization stack 1314, the HD geospatial database 1322, other components of the AV, and other data sources (e.g., the back-office system 150, the client computing device 1370, third-party data sources, etc.). Perception stack 1312 may detect and classify objects and determine their current and predicted locations, speeds, directions, and the like. In addition, the perception stack 1312 may determine the free space around the AV 102 (e.g., to maintain a safe distance from other objects, change lanes, park the AV, etc.). Perception stack 1312 may also identify environmental uncertainties, such as where to look for moving objects, flag areas that may be obscured or blocked from view, and so forth.

Mapping and localization stack 1314 may determine the AV's position and orientation (pose) using different methods from multiple systems (e.g., GPS, IMUs, cameras, LIDAR, RADAR, ultrasonic sensors, the HD geospatial database 1322, etc.). For example, in some embodiments, the AV 102 may compare sensor data captured in real-time by the sensor systems 1304-1308 to data in the HD geospatial database 1322 to determine its precise (e.g., accurate to the order of a few centimeters or less) position and orientation. The AV 102 may focus its search based on sensor data from one or more first sensor systems (e.g., GPS) by matching sensor data from one or more second sensor systems (e.g., LIDAR). If the mapping and localization information from one system is unavailable, the AV 102 may use mapping and localization information from a redundant system and/or from remote data sources.

Planning stack 1316 may determine how to maneuver or operate the AV 102 safely and efficiently in its environment. Planning stack 1316 may receive a route from back-office system 150 (e.g., routing part 402). Planning stack 1316 may determine a collision-free path based on information from perception stack 1312 and mapping and localization stack 1314 that completes the route. The planning stack 1316 may receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., an Emergency Vehicle (EMV) blaring a siren, intersections, occluded areas, street closures for construction or street repairs, DPVs, etc.), user input, and other relevant data for directing the AV 102 from one point to another. The planning stack 1316 may determine multiple sets of one or more mechanical operations that the AV 102 may perform (e.g., go straight at a specified speed or rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events.

The control stack 1318 may manage the operation of the vehicle propulsion system 1330. the braking system 1332, the steering system 1334, the safety system 1336, and the cabin system 1338. The control stack 1318 may receive sensor signals from the sensor systems 1304-1308 as well as communicate with other stacks or components of the compute system 120 or a remote system (e.g., the back-office system 150) to effectuate operation of the AV 102. For example, the control stack 1318 may implement the final path or actions from the multiple paths or actions provided by the planning stack 1316. Implementation may involve turning the routes and decisions from the planning stack 1316 into commands for the actuators that control the AV's steering, throttle, brake, and drive unit.

The communication stack 1320 may transmit and receive signals between the various stacks and other components of the AV 102 and between the AV 102, the back-office system 150, the client computing device 1370, and other remote systems. The communication stack 1320 may enable the AV compute system 120 to exchange information remotely over a network. Communication stack 1320 may coordinate with network connectivity system 130 to communicate with back-office system 150. The communication stack 1320 may also facilitate local exchange of information, such as through a wired connection or a local wireless connection.

The HD geospatial database 1322 may store HD maps and related data of the streets upon which the AV 102 travels. In some embodiments, the HD maps and related data may comprise multiple layers, such as an areas layer, a lanes and boundaries layer, an intersections layer, a traffic controls layer, and so forth. The areas layer may include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer may include geospatial information of road lanes (e.g., lane or road centerline, lane boundaries, type of lane boundaries, etc.) and related attributes (e.g., direction of travel, speed limit, lane type, etc.). The lanes and boundaries layer may also include 3D attributes related to lanes (e.g., slope, elevation, curvature, etc.). The intersections layer may include geospatial information of intersections (e.g., crosswalks, stop lines, turning lane centerlines, and/or boundaries, etc.) and related attributes. The traffic controls layer may include geospatial information of traffic signal lights, traffic signs, and other road objects and related attributes.

The AV operational database 1324 may store raw AV data generated by the sensor systems 1304-708 and other components of the AV 102 and/or data received by the AV 102 from remote systems (e.g., the back-office system 150, the client computing device 1370, etc.). In some embodiments, the raw AV data may include HD LIDAR point cloud data, image or video data, RADAR data, GPS data, and other sensor data that the back-office system 150 may use for creating or updating AV geospatial data as discussed further below and elsewhere in the present disclosure.

Back-office system 150 may be a private cloud (e.g., an enterprise network, a co-location provider network, etc.), a public cloud (e.g., an IaaS network, a PaaS network, a SaaS network, or other CSP network), a hybrid cloud, a multi-cloud, and so forth. Back-office system 150 may include one or more computing devices remote to the compute system 120 for managing a fleet of AVs and AV-related services. For example, in addition to managing the AV 102, the back-office system 150 may also support a ridesharing (or ride-hailing) service, a delivery service, a remote/roadside assistance service, street services (e.g., street mapping, street patrol, street cleaning, street metering, parking reservation, etc.), and the like.

Back-office system 150 may send and receive various signals to and from the AV 102 and the client computing device 1370. These signals may include sensor data captured by the sensor systems 1304-1308, roadside assistance requests, software updates, ridesharing (or ridehailing) pick-up and drop-off instructions, and so forth. In this example, the back-office system 150 includes one or more of device software management platform 1380, a data management platform 1352, an Artificial Intelligence/Machine Learning (AI/ML) platform 1354, a remote assistance platform 1358, a ridesharing (or ridehailing) platform 1360, and a map management platform 1362, among other systems. Back-office system 150 may include connectivity management system 350 and routing part 402.

Device software management platform 1380 may include a system to prescribe or control the components and the software versions running on AVs in a fleet of AVs (e.g., AV 102). Device software management platform 1380 may implement a software deployment system for deploying the software artifacts onto various AVs in the fleet.

Data management platform 1352 may be a big data' system capable of receiving and transmitting data at high speeds (e.g., near real-time or real-time), processing a large variety of data, and storing large volumes of data (e.g., terabytes, petabytes, or more of data). The varieties of data may include data having different structures (e.g., structured, semi-structured, unstructured, etc.), data of different types (e.g., sensor data, mechanical system data, ridesharing (or ridehailing) service data, map data, audio data, video data, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of back-office system 150 may access data stored by the data management platform 1352 to provide their respective services. Data management platform 1352 may assist connectivity management system 350 by managing data in quality measurements database 310 and quality measurements map 340 as seen in FIG. 3. Data management platform 1352 may assist connectivity management system 350 by managing data in location information 622 and eSIM profiles 632 as seen in FIG. 6.

The AI/ML platform 1354 may provide the infrastructure for training and evaluating machine learning algorithms for operating the AV 102, the remote assistance platform 1358, the ridesharing (or ridehailing) platform 1360, the map management platform 1362, and other platforms and systems. Using the AI/ML platform 1354, data scientists may prepare data sets from the data management platform 1352; select, design, and train machine learning models; evaluate, refine, and deploy the models; maintain, monitor, and retrain the models; and so on.

The remote assistance platform 1358 may generate and transmit instructions regarding the operation of the AV 102. For example, in response to an output of the AI/ML platform 1354 or other system of the back-office system 150, the remote assistance platform 1358 may prepare instructions for one or more stacks or other components of the AV 102.

The ridesharing (or ridehailing) platform 1360 may interact with a customer of a ridesharing (or ridehailing) service via a ridesharing (or ridehailing) application 1372 executing on the client computing device 1370. In some cases, client computing device 1370 may execute a delivery application. The client computing device 1370 may be a suitable type of computing system, including a server, desktop computer, laptop, tablet, smartphone, smart wearable device (e.g., smart watch; smart eyeglasses or other Head-Mounted Display (HMD); smart ear pods or other smart in-car, on-car, or over-ear device; etc.), gaming system, or other general-purpose computing device for accessing the ridesharing (or ridehailing) application 1372. The client computing device 1370 may be a customer's mobile computing device or a computing device integrated with the AV 102 (e.g., the compute system 120). The ridesharing (or ridehailing) platform 1360 may receive requests to be picked up or dropped off from the ridesharing (or ridehailing) application 1372 and dispatch the AV 102 for the trip.

Map management platform 1362 may provide a set of tools for the manipulation and management of geographic and spatial (geospatial) and related attribute data. The data management platform 1352 may receive LIDAR point cloud data, image data (e.g., still image, video, etc.), RADAR data, GPS data, and other sensor data (e.g., raw data) from one or more AVs (e.g., AV 102), Unmanned Aerial Vehicles (UAVs), satellites, third-party mapping services, and other sources of geospatially referenced data. In some embodiments, the map viewing services of map management platform 1362 may be modularized and deployed as part of one or more of the platforms and systems of the back-office system 150. For example, the AI/ML platform 1354 may incorporate the map viewing services for visualizing the effectiveness of various object detection or object classification models, the remote assistance platform 1358 may incorporate the map viewing services for replaying traffic incidents to facilitate and coordinate aid, the ridesharing (or ridehailing) platform 1360 may incorporate the map viewing services into the client application 1372 to enable passengers to view the AV 102 in transit enroute to a pick-up or drop-off location, and so on. Map management platform 1362 may assist connectivity management system 350 by processing and displaying data in quality measurements map 340 as seen in FIG. 3.

Exemplary Processor-Based System

Figure 14:
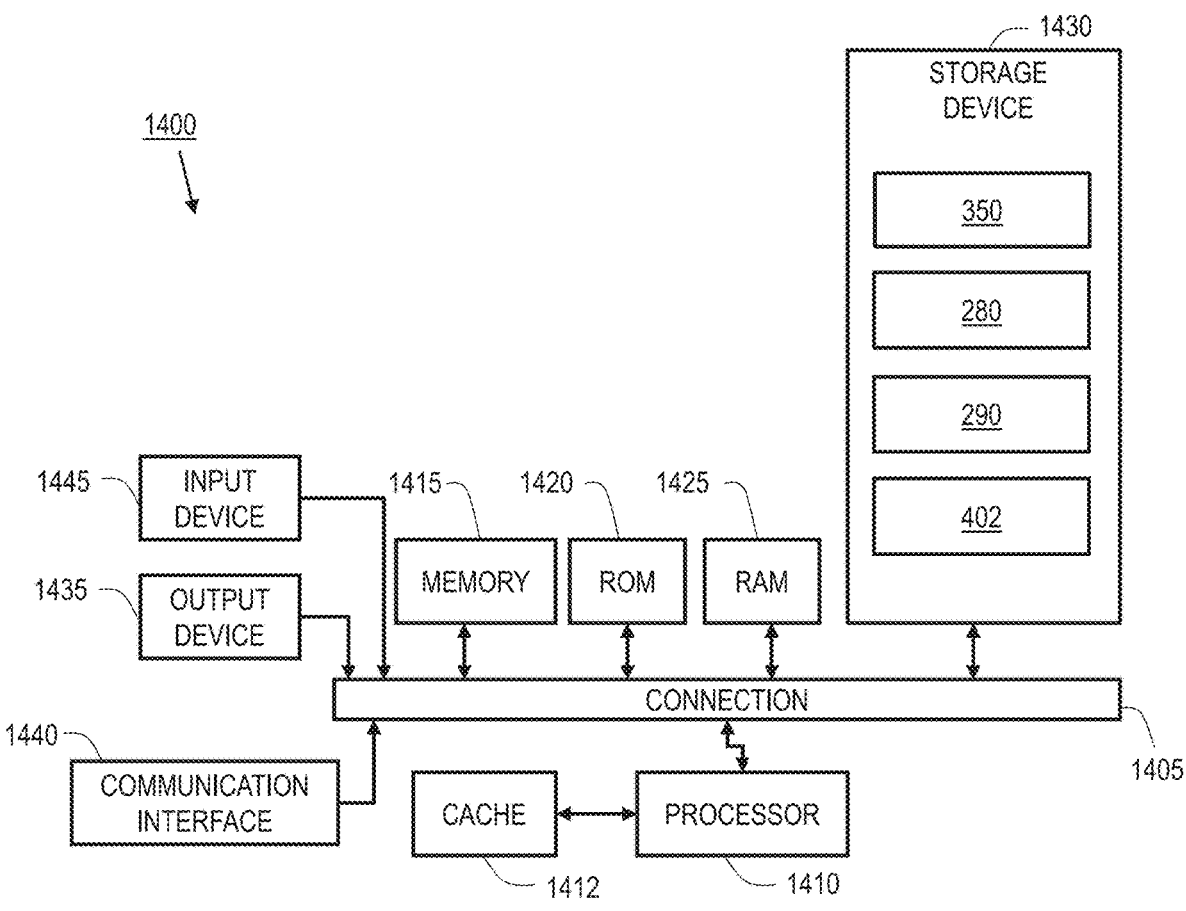
FIG. 14 illustrates an exemplary processor-based system with which some aspects of the subject technology may be implemented.

FIG. 14 illustrates an example processor-based system 1400 with which some aspects of the subject technology may be implemented. AV 102 and back-office system 150 described herein can include processor-based systems such as the processor-based system 1400. For example, processor-based system 1400 may be any computing device making up, or any component thereof in which the components of the system are in communication with each other using connection 1405. Connection 1405 may be a physical connection via a bus, or a direct connection into processor 1410, such as in a chipset architecture. Connection 1405 may also be a virtual connection, networked connection, or logical connection. Connection 1405 may be an example of inter-process communication.

In some embodiments, computing system 1400 is a distributed system in which the functions described in this disclosure may be distributed within a datacenter, multiple data centers, a peer network, etc. In some embodiments, one or more of the described system components represents many such components each performing some or all of the function for which the component is described. In some embodiments, the components may be physical or virtual devices.

Example system 1400 includes at least one processing unit (Central Processing Unit (CPU), Graphical Processing Unit (GPU), Machine Learning processor, microprocessor, or other suitable processor) 1410 and connection 1405 that couples various system components including system memory 1415, such as Read-Only Memory (ROM) 1420 and Random-Access Memory (RAM) 1425 to processor 1410. Computing system 1400 may include a cache of high-speed memory 1412 connected directly with, in close proximity to, or integrated as part of processor 1410.

Processor 1410 may include any general-purpose processor and a hardware service or software service, implementing functionalities encoded as instructions stored on storage device 1430 as illustrated in the figures. Processor 1410 may essentially be a completely self-contained computing system, containing multiple cores or processors, a bus, memory controller, cache, etc. A multi-core processor may be symmetric or asymmetric.

To enable user interaction, computing system 1400 includes an input device 1445, which may represent any number of input mechanisms, such as a microphone for speech, a touch-sensitive screen for gesture or graphical input, keyboard, mouse, motion input, speech, etc. Computing system 1400 may also include output device 1435, which may be one or more of a number of output mechanisms known to those of skill in the art. In some instances, multimodal systems may enable a user to provide multiple types of input/output to communicate with computing system 1400. Computing system 1400 may include communications interface 1440, which may generally govern and manage the user input and system output. The communication interface may perform or facilitate receipt and/or transmission of wired or wireless communications via wired and/or wireless transceivers.

Communication interface 1440 may also include one or more GNSS receivers or transceivers that are used to determine a location of the computing system 1400 based on receipt of one or more signals from one or more satellites associated with one or more GNSS systems. GNSS systems include, but are not limited to, the US-based GPS, the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1430 may be a non-volatile and/or non-transitory and/or computer-readable memory device and may be a hard disk or other types of computer-readable media which may store data that is accessible by a computer.

Storage device 1430 may include software services, servers, services, radios (e.g., transceivers), etc., that when the code that defines such software is executed by the processor 1410, it causes the system 1400 to perform a function. In some embodiments, a hardware service that performs a particular function may include the software component stored in a computer-readable medium in connection with the necessary hardware components, such as processor 1410, connection 1405, output device 1435, etc., to carry out the function.

Storage device 1430 may include instructions encoded thereon to implement components such as components of connectivity management system 350, quality measurement part 290, controller part 280, routing part 402 etc. The components and the functionalities being performed are illustrated in FIGS. 1-12.

Embodiments within the scope of the present disclosure may also include tangible and/or non-transitory computer-readable storage media or devices for carrying or having computer-executable instructions or data structures stored thereon. Such tangible computer-readable storage devices may be any available device that may be accessed by a general-purpose or special-purpose computer, including the functional design of any special-purpose processor as described above. By way of example, and not limitation, such tangible computer-readable devices may include RAM, ROM, EEPROM, CD-ROM or other optical disk storage, magnetic disk storage or other magnetic storage devices, or any other device which may be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special-purpose computer, or special-purpose processing device to perform a certain function or group of functions. Computer-executable instructions also include program modules that are executed by computers in stand-alone or networked environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in networked computing environments with many types of computer system configurations, including personal computers, hand-held devices, multi-processor systems, micro-processor-based or programmable consumer electronics, network personal computers (PCs), minicomputers, main-frame computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

Select Examples

Example 1 is a method to toggle network operator connectivity for a vehicle, comprising: determining network operator connectivity quality information corresponding to a segment of a route expected to be traveled by the vehicle and a future time that the vehicle is expected to travel the segment; determining a first embedded subscriber identity module (eSIM) is in active mode and a second eSIM is in a standby mode on a first network access device of the vehicle; determining a third eSIM is in active mode and a fourth eSIM is in standby mode on a second network access device of the vehicle; determining from the network operator connectivity quality information that connectivity associated with the first eSIM is expected to be poorer than connectivity associated with the second eSIM; and upon the vehicle arriving at a location within a threshold distance from the segment, setting the second eSIM to be in active mode and the first eSIM to be in standby mode on the first network access device.

In Example 2, the method of Example 1 can optionally include causing the vehicle to travel the segment while the second eSIM is in active mode and the first eSIM is in standby mode on the first network access device.

In Example 3, the method of Example 1 or 2 can optionally include: determining the threshold distance based on a speed limit of the segment and an expected time to change modes of eSIMs in the first network access device.

In Example 4, the method of any one of Examples 1-3 can optionally include the first eSIM, the second eSIM, the third eSIM, and the fourth eSIM connecting to at least three different network operators.

In Example 5, the method of any one of Examples 1~4 can optionally the network operator connectivity quality information comprising: information indicating at least one network operator is underperforming.

In Example 6, the method of any one of Examples 1-5 can optionally include the network operator connectivity quality information comprising: a time frame that the network operator connectivity quality information is valid.

In Example 7, the method of any one of Examples 1-6 can optionally include the network operator connectivity quality information comprising: one or more segments and one or more times of day to which the network operator connectivity quality information corresponds.

In Example 8, the method of any one of Examples 1-7 can optionally include logging network operator quality measurement data at the first network access device and the second network access device; and transmitting the network operator quality measurement data to a back-office system.

In Example 9, the method of Example 8 can optionally include the network operator quality measurement data comprising received signal strength indicator information corresponding to different network operators.

In Example 10, the method of Example 8 or 9 can optionally include the network operator quality measurement data having corresponding location coordinates and timestamps.

In Example 11, the method of any one of Examples 1-10 can optionally include receiving the route and the network operator connectivity quality information corresponding to segments in the route from a back-office system.

In Example 12, the method of any one of Examples 1-11 can optionally include receiving the network operator connectivity quality information from a back-office system.

In Example 13, the method of any one of Examples 1-12 can optionally include determining from the network operator connectivity quality information that connectivity associated with the second eSIM is expected to be better than connectivity associated with the first eSIM and connectivity associated with the third eSIM; and upon the vehicle arriving at the location within the threshold distance from the segment, keeping the third eSIM in active mode and the fourth eSIM in standby mode on the second network access device.

In Example 14, the method of any one of Examples 1-13 can optionally include receiving an instruction from a back-office system to set the second eSIM to be in active mode and the first eSIM to be in standby mode on the first network access device.

Example 15 is a method to toggle network operator connectivity for a vehicle, comprising: determining network operator connectivity quality information corresponding to a segment of a route expected to be traveled by the vehicle and a future time that the vehicle is expecting to travel the segment; determining a first electronic subscriber identity module (eSIM) is in active mode and a second eSIM is in a standby mode on a first network access device of the vehicle; determining a third eSIM in active mode and a fourth eSIM is in standby mode on a second network access device of the vehicle; determining from the network operator connectivity quality information that connectivity associated with the third eSIM is expected to be poorer than connectivity associated with the first eSIM; and upon the vehicle arriving at a location within a threshold distance from the segment, setting the fourth eSIM to be in active mode and the third eSIM to be in standby mode on the second network access device.

In Example 16, the method of Example 15 can optionally include causing the vehicle to travel the segment while the fourth eSIM is in active mode and the third eSIM is in standby mode on the second network access device.

Example 17 is a method to toggle network operator connectivity for a vehicle, comprising: determining network operator connectivity quality information corresponding to a segment of a route expected to be traveled by the vehicle and a future time that the vehicle is expecting to travel the segment; determining a first electronic subscriber identity module (eSIM) is in active mode and a second eSIM is in a standby mode on a first network access device of the vehicle; determining a third eSIM in active mode and a fourth eSIM is in standby mode on a second network access device of the vehicle; determining from the network operator connectivity quality information that connectivity associated with the first eSIM, connectivity with the second eSIM, connectivity with the third eSIM, and connectivity with the fourth eSIM are expected to be poor; updating the route to avoid the segment; and causing the vehicle to travel the updated route.

In Example 18, the method of Example 17 can optionally include the updating being performed by a back-office system, and the back-office system sending the updated route to the vehicle.

In Example 19, the method of Example 17 can optionally include the updating being performed by the vehicle.

Example 20 is a method to toggle network operator connectivity for a vehicle, comprising: logging network operator quality measurement data at a first network access device and a second network access device of the vehicle; determining a first electronic subscriber identity module (cSIM) is in active mode and a second eSIM is in a standby mode on the first network access device; determining a third eSIM in active mode and a fourth eSIM is in standby mode on the second network access device; determining from network operator quality measurement data that connectivity associated with the first eSIM is poor; setting the second eSIM to be in active mode and the first eSIM to be in standby mode on the first network access device; and keeping the third eSIM in active mode and the fourth eSIM in standby mode on the second network access device.

Any one of the optional features included in Examples 2-14 may be added to any one of Examples 15-20.

Example 21 is a vehicle, comprising: a compute system to control the vehicle to complete segments of a route; and network connectivity system to routinely receive heartbeat notifications from a back-office system, comprising: a first network access device having a first electronic subscriber identity module (eSIM) in active mode and a second eSIM in a standby mode; a second network access device having a third eSIM in active mode and a fourth eSIM is in a standby mode; a quality measurement part to log network operator quality measurement data at the first network access device and the second network access device; and a controller part to: cause the first network access device to swap the first and second eSIMs being between being in active mode and standby mode; and cause the second network access device to swap the third and fourth eSIMs between being in active mode and standby mode.

In Example 22, the vehicle of Example 21 can optionally include the compute system entering a degraded state of operation in response to the network connectivity system not receiving heartbeat notifications for a period of time.

In Example 23, the vehicle of Example 21 or 22 can optionally include the controller part performing swapping on one or more of the first network access device and the second network access device based on the network operator quality measurement data.

In Example 24, the vehicle of any one of Examples 21-23 can optionally the controller part performing swapping on one or more of the first network access device and the second network access device based on network operator connectivity quality information corresponding to a segment of the route expected to be traveled by the vehicle and a future time that the vehicle is expecting to travel the segment.

In Example 25, the vehicle of any one of Examples 21-24 can optionally include eSIMs concurrently in active mode on the first network access device and the second network access device (always) being with different network operators.

Example 26 includes one or more non-transitory computer-readable media storing instructions that, when executed by one or more processors, cause the one or more processors to perform any one of the computer-implemented methods of Examples 1-20.

Example 27 is an apparatus comprising means to carry out any one of the computer-implemented methods of Examples 1-20.

What is claimed is:
1. A method to toggle network operator connectivity for a vehicle, comprising:
   determining, using compute system including a network connectivity system, network operator connectivity quality information corresponding to a segment of a route expected to be traveled by the vehicle and a future time that the vehicle is expected to travel the segment; determining a first embedded subscriber identity module (eSIM) is in active mode and a second eSIM is in a standby mode on a first network access device of the vehicle; determining a third eSIM is in active mode and a fourth eSIM is in standby mode on a second network access device of the vehicle; determining from the network operator connectivity quality information that connectivity associated with the first eSIM is expected to be poorer than connectivity associated with the second eSIM; and upon the vehicle arriving at a location within a threshold distance from the segment, wherein the threshold distance is set based on a network attachment time, setting the second eSIM to be in active mode and the first eSIM to be in standby mode on the first network access device, and wherein the vehicle arriving at the location occurs prior to the vehicle entering the segment.

2. The method of claim 1, further comprising: causing the vehicle to travel the segment while the second eSIM is in active mode and the first eSIM is in standby mode on the first network access device.

3. The method of claim 1, further comprising: determining the threshold distance based on a speed limit of the segment and an expected time to change modes of eSIMs in the first network access device.

4. The method of claim 1, wherein the first eSIM, the second eSIM, the third eSIM, and the fourth eSIM connect to at least three different network operators.

5. The method of claim 1, wherein the network operator connectivity quality information comprises: information indicating at least one network operator is underperforming.

6. The method of claim 1, wherein the network operator connectivity quality information comprises: a time frame that the network operator connectivity quality information is valid.

7. The method of claim 1, wherein the network operator connectivity quality information comprises: one or more segments and one or more times of day to which the network operator connectivity quality information corresponds.

8. The method of claim 1, further comprising: logging network operator quality measurement data at the first network access device and the second network access device; and transmitting the network operator quality measurement data to a back-office system.

9. The method of claim 8, wherein the network operator quality measurement data comprises received signal strength indicator information corresponding to different network operators.

10. The method of claim 8, wherein the network operator quality measurement data has corresponding location coordinates and timestamps.

11. The method of claim 1, further comprising: receiving the route and the network operator connectivity quality information corresponding to segments in the route from a back-office system.

12. The method of claim 1, further comprising: receiving the network operator connectivity quality information from a back-office system.

13. The method of claim 1, further comprising: determining from the network operator connectivity quality information that connectivity associated with the second eSIM is expected to be better than connectivity associated with the first eSIM and connectivity associated with the third eSIM; and upon the vehicle arriving at the location within the threshold distance from the segment, keeping the third eSIM in active mode and the fourth eSIM in standby mode on the second network access device.

14. The method of claim 1, further comprising: receiving an instruction from a back-office system to set the second eSIM to be in active mode and the first eSIM to be in standby mode on the first network access device.

15. A method to toggle network operator connectivity for a vehicle, comprising: determining, using a compute system including a network connectivity system, network operator connectivity quality information corresponding to a segment of a route expected to be traveled by the vehicle and a future time that the vehicle is expecting to travel the segment; determining a first electronic subscriber identity module (eSIM) is in active mode and a second eSIM is in a standby mode on a first network access device of the vehicle; determining a third eSIM in active mode and a fourth eSIM is in standby mode on a second network access device of the vehicle; determining from the network operator connectivity quality information that connectivity associated with the third eSIM is expected to be poorer than connectivity associated with the first eSIM; and upon the vehicle arriving at a location within a threshold distance from the segment, wherein the threshold distance is dependent on a network attachment time, setting the fourth eSIM to be in active mode and the third eSIM to be in standby mode on the second network access device, and wherein the vehicle arriving at the location occurs prior to the vehicle entering the segment.

16. The method of claim 15, further comprising: causing the vehicle to travel the segment while the fourth eSIM is in active mode and the third eSIM is in standby mode on the second network access device.

17. A vehicle, comprising: a compute system to control the vehicle to complete segments of a route; and network connectivity system to routinely receive heartbeat notifications from a back-office system, comprising: a first network access device having a first electronic subscriber identity module (eSIM) in active mode and a second eSIM in a standby mode; a second network access device having a third eSIM in active mode and a fourth eSIM is in a standby mode; a quality measurement part to log network operator quality measurement data at the first network access device and the second network access device; and a controller part to: cause the first network access device to swap the first and second eSIMs being between being in active mode and standby mode; and cause the second network access device to swap the third and fourth eSIMs between being in active mode and standby mode; wherein the controller part performs swapping on one or more of the first network access device and the second network access device based on network operator connectivity quality information corresponding to a segment of the route expected to be traveled by the vehicle and a future time that the vehicle is expecting to travel the segment; and wherein the swapping on one or more of the first network access device and the second access device is performed responsive to the vehicle arriving at a location within a threshold distance of a segment of the segments of the route, and wherein the vehicle arriving at the location occurs prior to the vehicle entering the segment.

18. The vehicle of claim 17, wherein the compute system enters a degraded state of operation in response to the network connectivity system not receiving heartbeat notifications for a period of time.

19. The vehicle of claim 17, wherein the controller part performs swapping on one or more of the first network access device and the second network access device based on the network operator quality measurement data.

20. The method of claim 1, wherein upon the vehicle arriving the a location within the threshold distance from the segment, the third eSIM and the fourth eSIM are maintained in a current active/standby mode.

\* \* \* \* \*